United States Patent
Yokoi et al.

(10) Patent No.: US 6,331,898 B1
(45) Date of Patent: *Dec. 18, 2001

(54) ENCODED DATA PRINTING APPARATUS AND METHOD FOR PRINTING A CODE AND AN IMAGE ON THE SAME MEDIUM

(75) Inventors: Katsuyuki Yokoi, Yokohama; Kazuhiro Nakata, Inagi; Atsushi Arai, Kawasaki; Haruyuki Yanagi, Machida, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,378

(22) Filed: May 27, 1997

Related U.S. Application Data

(63) Continuation of application No. 08/197,871, filed on Feb. 17, 1994, now abandoned.

(30) Foreign Application Priority Data

| Feb. 17, 1993 | (JP) | 5-027939 |
| Feb. 10, 1994 | (JP) | 6-016250 |

(51) Int. Cl.[7] .................................................. B41B 15/00
(52) U.S. Cl. .......................... 358/1.9; 358/462; 382/135
(58) Field of Search .................................. 395/101, 104, 395/105, 106, 109, 110, 111, 117; 358/500, 501, 526, 530, 539, 540, 437, 462, 401, 468, 450, 296; 382/182, 183, 184, 188, 190, 194, 135, 203; 355/32, 40; 399/181, 182

(56) References Cited

U.S. PATENT DOCUMENTS

| 4,449,052 | * | 5/1984  | Krieg .................................. 250/568 |
| 4,641,347 |   | 2/1987  | Clark et al. ............................ 380/3 |
| 4,951,140 | * | 8/1990  | Ueno et al. ............................ 348/413 |
| 5,091,966 | * | 2/1992  | Bloomberg et al. .................. 382/203 |
| 5,109,272 | * | 4/1992  | Kinoshita et al. .................... 358/500 |
| 5,175,635 | * | 12/1992 | Yamada et al. ....................... 358/467 |
| 5,216,753 | * | 6/1993  | Ng ......................................... 395/109 |
| 5,257,119 |   | 10/1993 | Funada et al. ........................ 358/438 |
| 5,398,308 | * | 3/1995  | Kato et al. ............................ 395/133 |
| 5,457,540 |   | 10/1995 | Kajita ................................... 358/296 |
| 5,465,161 |   | 11/1995 | Funada et al. ........................ 358/438 |

FOREIGN PATENT DOCUMENTS

| 0331758    | * | 9/1989  | (EP) . |
| 0493053    |   | 7/1992  | (EP) ............................... G06K/1/12 |
| 0493091    |   | 7/1992  | (EP) ............................... G06K/1/12 |
| 0506332    |   | 9/1992  | (EP) ............................... G06K/15/00 |
| 63-214067  |   | 9/1988  | (JP) . |
| 1-286674   |   | 11/1989 | (JP) . |
| 1-222393   |   | 9/1990  | (JP) ............................... G06K/19/00 |

OTHER PUBLICATIONS

Y. Nakamura et al., "A Unified Coding Method of Dithered Image and Text Data Using Micro–Patterns", The Trans. Of the Institute Of Electronics, Information and Communication Engineers, vol. J70–B, No. 12, Dec. 1987, pp. 1475–1481.

* cited by examiner

Primary Examiner—Garcia Gabriel
(74) Attorney, Agent, or Firm—Fitzpatrick, Cella, Harper & Scinto

(57) ABSTRACT

A code printing method and apparatus which prints an image and a code on the same recording medium. The apparatus stores a plurality of density patterns corresponding to each density, and codes corresponding to the density patterns. When code data is inputted and printing of the code is instructed, the apparatus determines the density of each pixel of image data, selects the density pattern representing the code data among the density patterns corresponding to the pixel density, and prints the density pattern instead of the image pixel. Thus, the image and code are printed without deterioration of image quality.

16 Claims, 24 Drawing Sheets

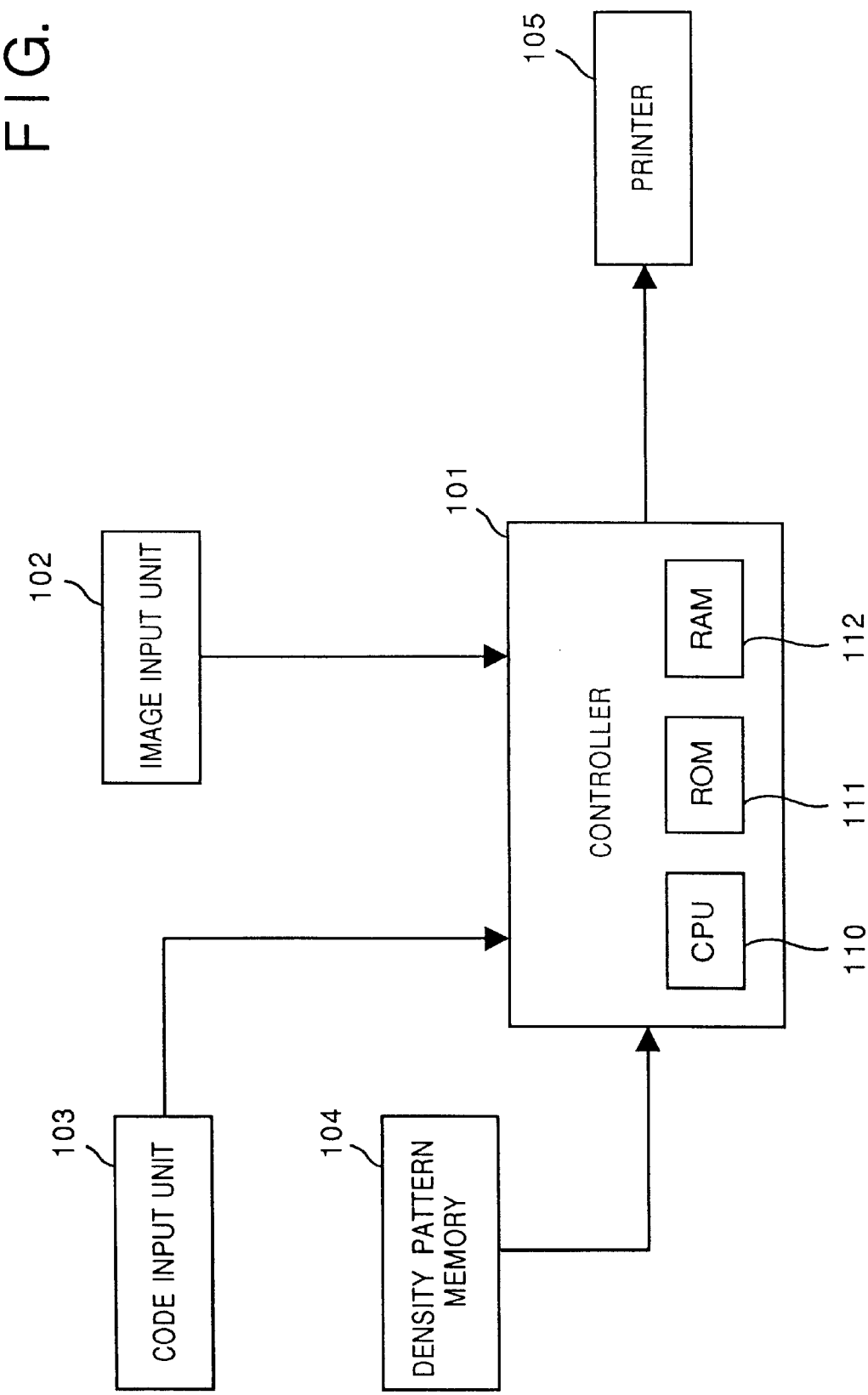

DENSITY 0

DENSITY 1

DENSITY 2

DENSITY 3

DENSITY 4

FIG. 3

| PATTERN NO. | B1 | B2 |
|---|---|---|
| 1 | 0 | 0 |
| 2 | 0 | 1 |
| 3 | 1 | 0 |
| 4 | 1 | 1 |

L PIXELS

FIG. 7A
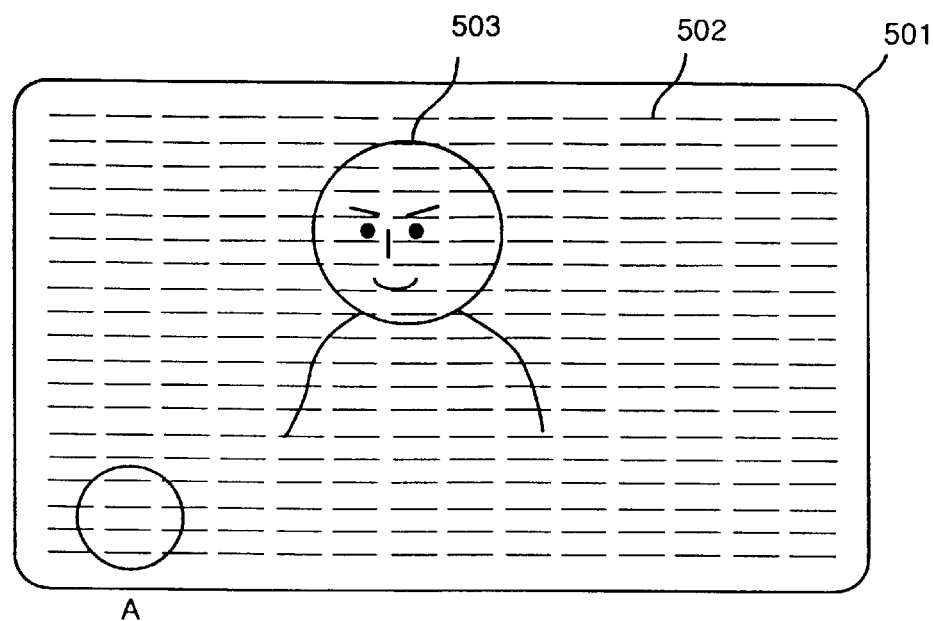
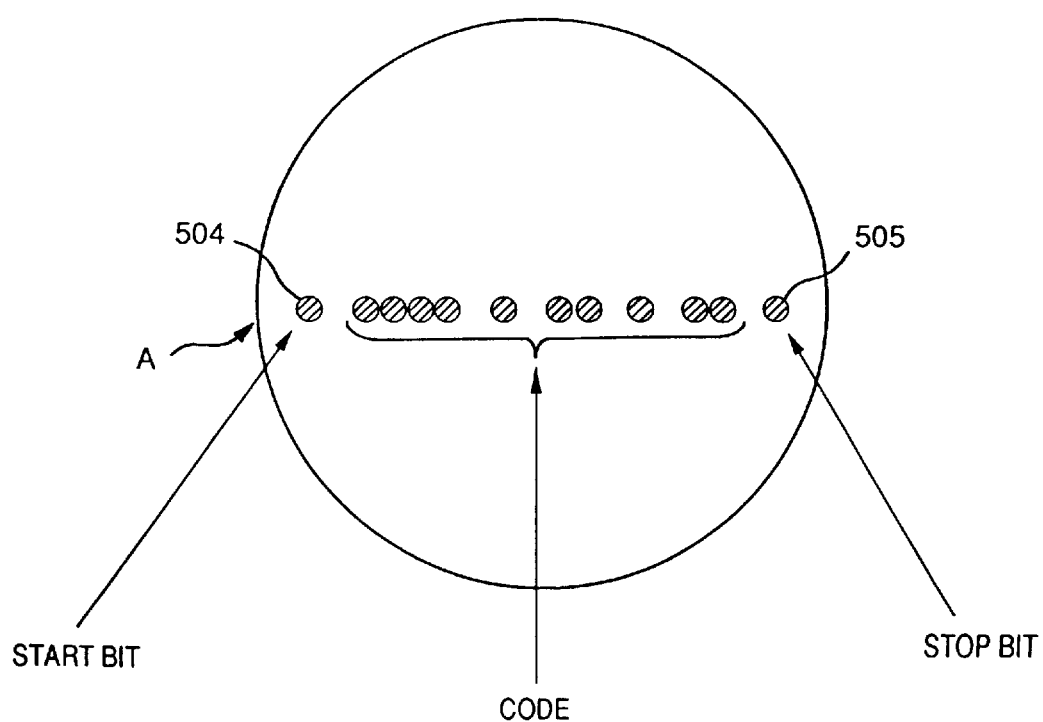
FIG. 7B

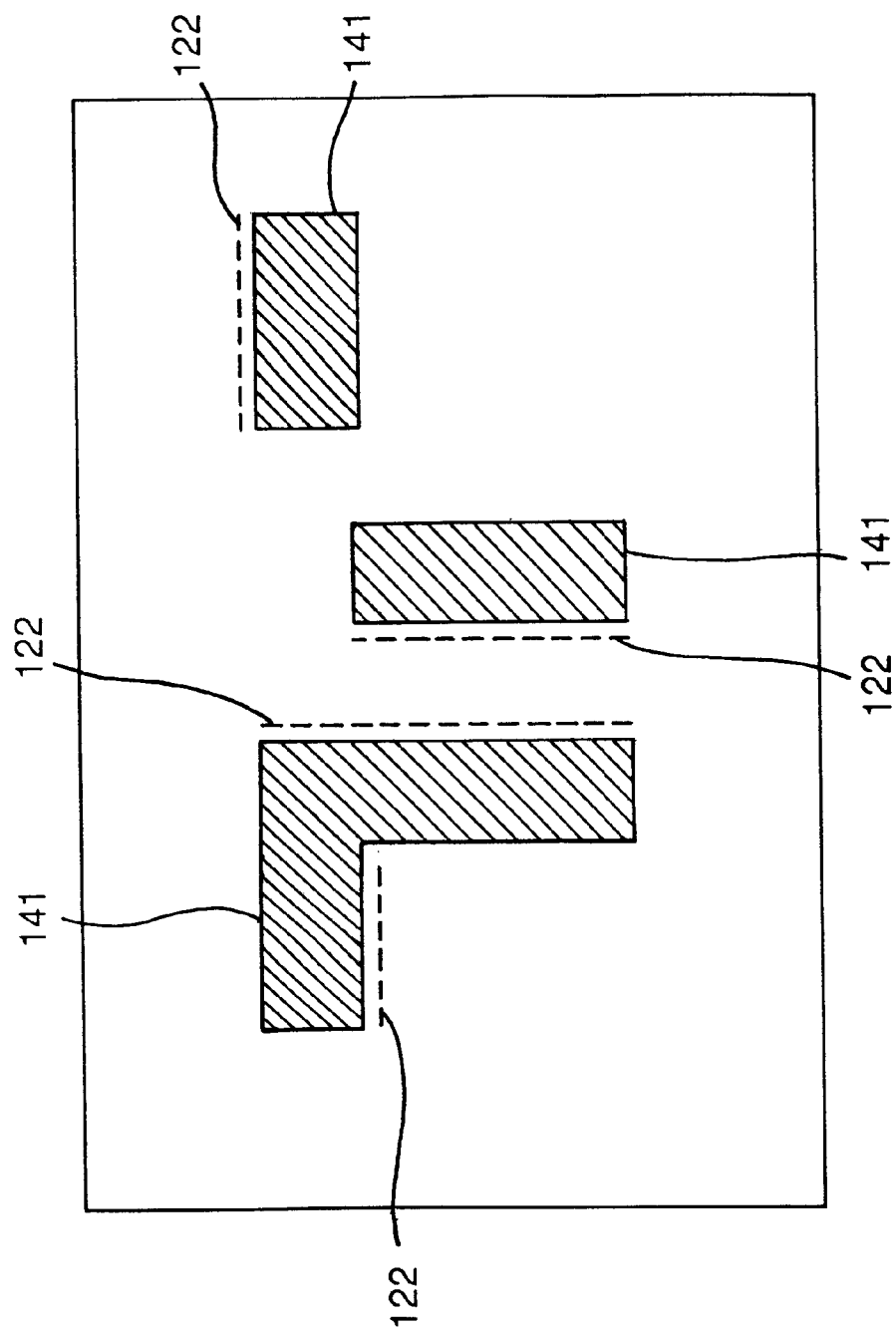

FIG. 18
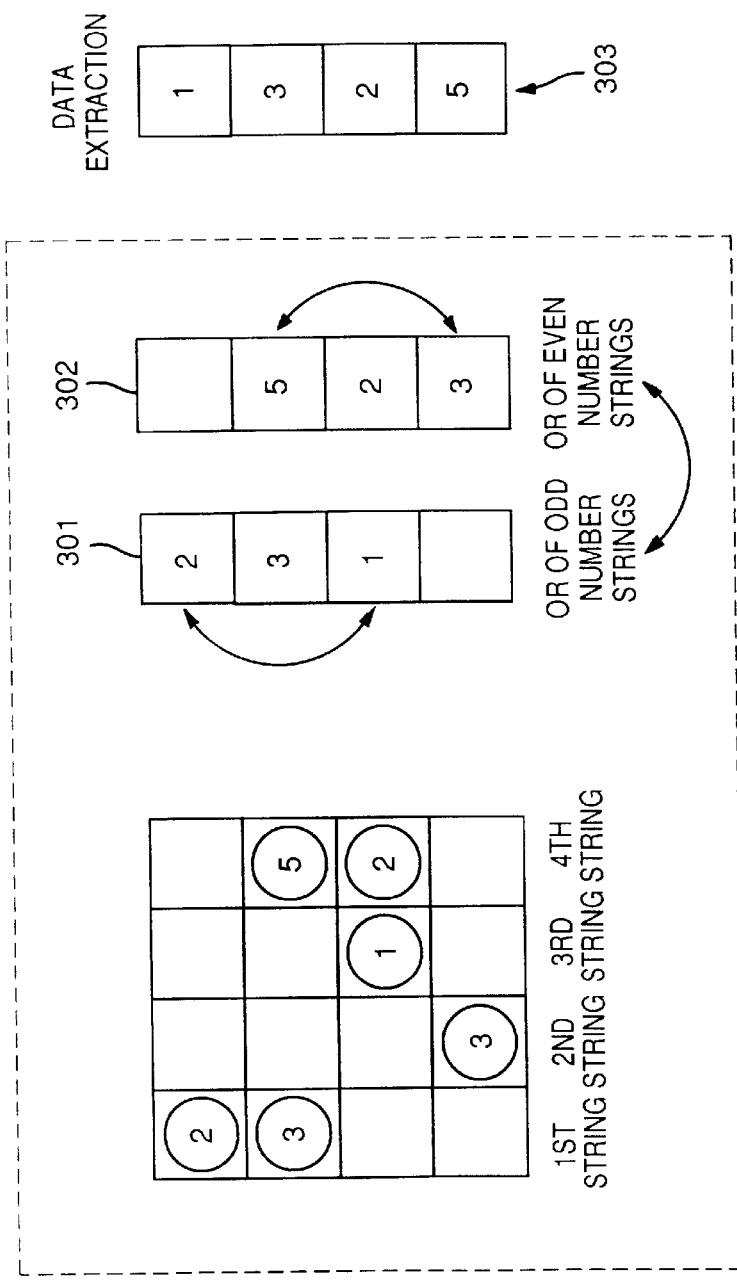
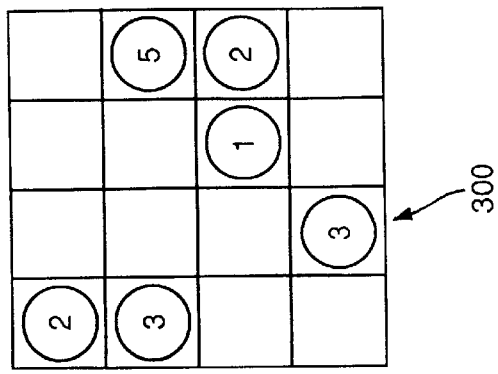

ENCODED DATA PRINTING APPARATUS AND METHOD FOR PRINTING A CODE AND AN IMAGE ON THE SAME MEDIUM

This application is a continuation, of application Ser. No. 08/197,871, filed Feb. 17, 1994, now abandoned.

BACKGROUND OF THE INVENTION

The present invention relates to encoded data printing apparatus and method capable of printing an image in unit of dots on a recording medium.

It is known to print encoded data (symbol) obtained by coding characters or numbers by a printer which prints an image by dots on a recording medium. Among such codes, there is a one-dimensional bar code or a two-dimensional bar code. The one-dimensional bar code has a plurality of vertical lines whose widths and intervals are changed to correspond to coded characters or numbers. The two-dimensional bar code is printed so as to blacken the unit area or to form a white area in accordance with coded characters and numbers.

As described above, in the conventional technique, bar codes are printed in a black/white pattern. Accordingly, if such a bar code is printed on various cards having artistic value in their designs such as a membership's card, the original design can be disfigured by the black/white bar code.

Furthermore, since the bar code can be visually discriminated, any person can easily recognize that the bar code is printed, and there is a problem in that the bar-coded information may be decoded and used for an incorrect purpose.

SUMMARY OF THE INVENTION

In light of the above problems of the prior art, it is an object of the present invention to provide a code printing apparatus and method capable of printing an image and a code without deterioration of the image quality.

It is another object of the present invention to provide a code printing apparatus and method capable of printing a code without deterioration of the image quality, and improving the confidentiality of the information represented by a code, when an image whose tone is expressed by using a pixel including a plurality of dots is printed with a code, by selecting a density pattern representing the tone based on the code, and inlaying the code into the image.

It is another object of the present invention to provide a code printing apparatus and method capable of developing and printing a code in a color image without deterioration of the quality of an original color image, in a case where the color image is printed.

It is still another object of the present invention to provide a code printing apparatus and method capable of printing a code without deterioration of the originality and artistic value of an image, and improving the confidentiality of the information represented by a code.

It is still another object of the present invention to provide a code printing apparatus and method capable of printing a code having a large amount of information without deterioration of the image quality by printing a code by using the pixels whose color most often appears in the image.

It is still another object of the present invention to provide a code printing apparatus and method capable of printing a code by inlaying into an image, in the case where there is not enough space to print the code.

It is still another object of the present invention to provide a code printing apparatus and method capable of improving confidentiality of information represented by a code and avoiding deterioration of image quality by printing the code in an image so that it cannot be visually distinguished.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 1 is a block diagram illustrating a general construction of a code printing apparatus of the first embodiment of the invention;

Figure 3:
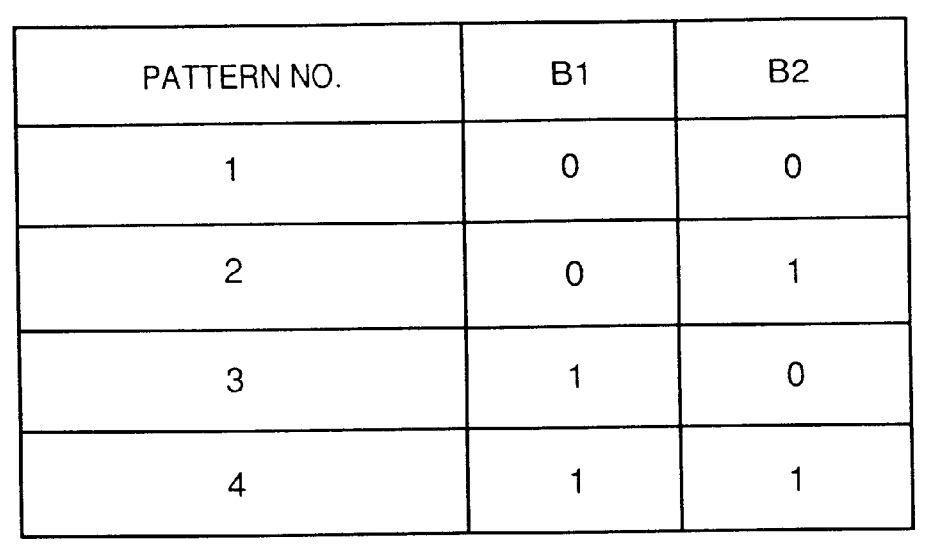

FIG. 3 is a diagram illustrating the relationship between the codes and the density patterns of FIGS. 2A–2E;

FIG. 7 is a diagram illustrating an example where the code of the third embodiment is printed on the background of an image;

FIG. 12 is a diagram illustrating an example of the modification of the fourth embodiment where an image and a code are printed;

FIG. 18 is a diagram which is useful for explaining a method of reading the recording image in the seventh embodiment and reproducing the original code;

DESCRIPTION OF THE PREFERRED EMBODIMENTS

Preferred embodiments of the present invention will now be described in detail in accordance with the accompanying drawings.

[First Embodiment]

When a halftone image is printed by using a printer which can perform binary printing (a dot expresses only black and white) or a printer which cannot perform sufficient halftone reproduction, a processing which represents halftone in digital representation is performed by expressing a pixel using a plurality of dots. For example, when a halftone is represented by a pixel which is composed of 2×2 dots, the pixel has five levels of density (density 0–density 4). The five levels of density are shown in FIGS. 2A–2E. As apparent from FIGS. 2B–2D, four or more than four dot patterns exist with respect to a pixel whose density level is 1–3. Accordingly, if each dot pattern corresponds to a unique code, the pixels whose density levels are the same can represent different codes. In the examples of FIGS. 2B–2D, the dot patterns are numbered from "1" to "4" for the pixels whose density level is "1" through "3". Note that there are six dot patterns for the density level "2", while, only four of these patterns are actually used in present the embodiment, to simplify the description. In FIG. 3, two bits (B1, B2) are assigned to each of the four types of dot patterns in FIGS. 2B–2D.

Subsequently, as shown in FIG. 3, a 2-bit code per pixel can be expressed, if the pixel has the density level 1–3, and when 2-bit information indicated by B1 and B2 is made to correspond to each of the four types of dot patterns.

Figure 2A:
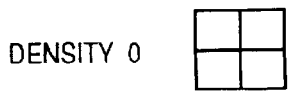
FIGS. 2A–2E are diagrams illustrating the relationship between the density of each pixel and the dot arrangement when a pixel is represented by 2×2 dots.
Figure 2B:
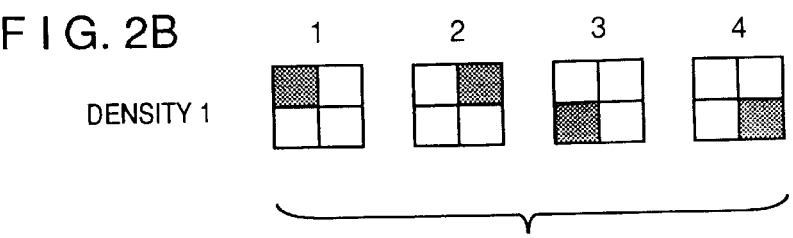
Figure 2C:
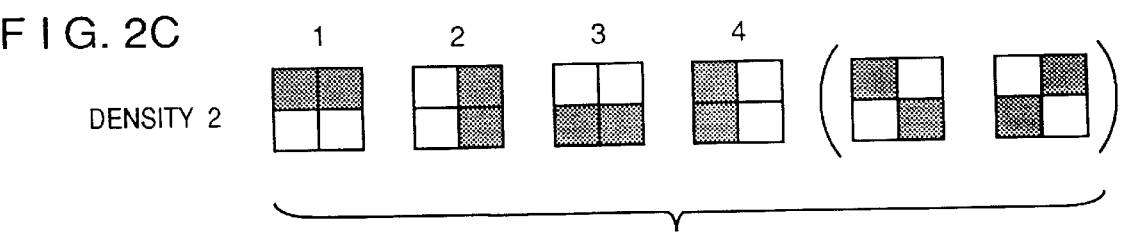
Figure 2D:
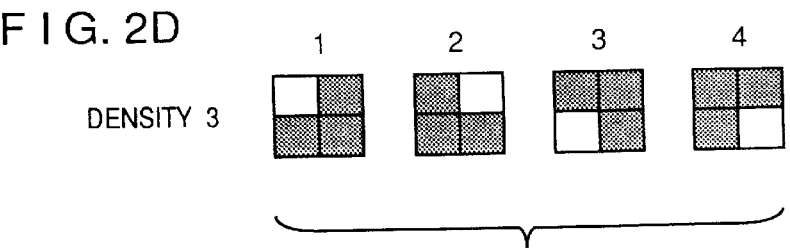
Figure 2E:
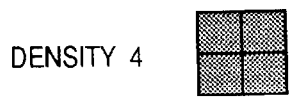

In FIGS. 2A and 2E, a code cannot be added to the pixel whose density level is "0" or "4" (the maximum density); however, this is not a problem in a halftone image such as a photographic image, if the pixels having such density levels are not printed. Furthermore, when a halftone expression is not sufficient using a 2×2 dot matrix, the number of dots of the dot matrix can be increased to, for example, 8×8 dots, resulting in 65 density levels of halftone. In this case too, there is no substantial problem if the density "0" and the maximum density cannot be printed.

FIG. 1 is a block diagram illustrating a general construction of the code printing apparatus of the first embodiment.

In FIG. 1, numeral 101 is a controller which controls the entire apparatus, numeral 102 is an image input unit, such as a scanner, which reads image data, and numeral 103 is a code input unit. Numeral 104 is a density pattern memory which stores density patterns corresponding to each density pattern, such as shown in FIG. 2, to represent a pixel in multi-levels. Numeral 105 is a printer which prints image data inputted from the image input unit 102 and an encoded pattern corresponding to a code inputted from the code input unit 103 on a recording medium such as plastic or paper. The controller 101 includes a CPU 110 such as a microprocessor, a ROM 111 which stores control programs of the CPU 110 and various data, and a RAM 112 which is used as a work area of the CPU 110 and stores various data.

Figure 4:
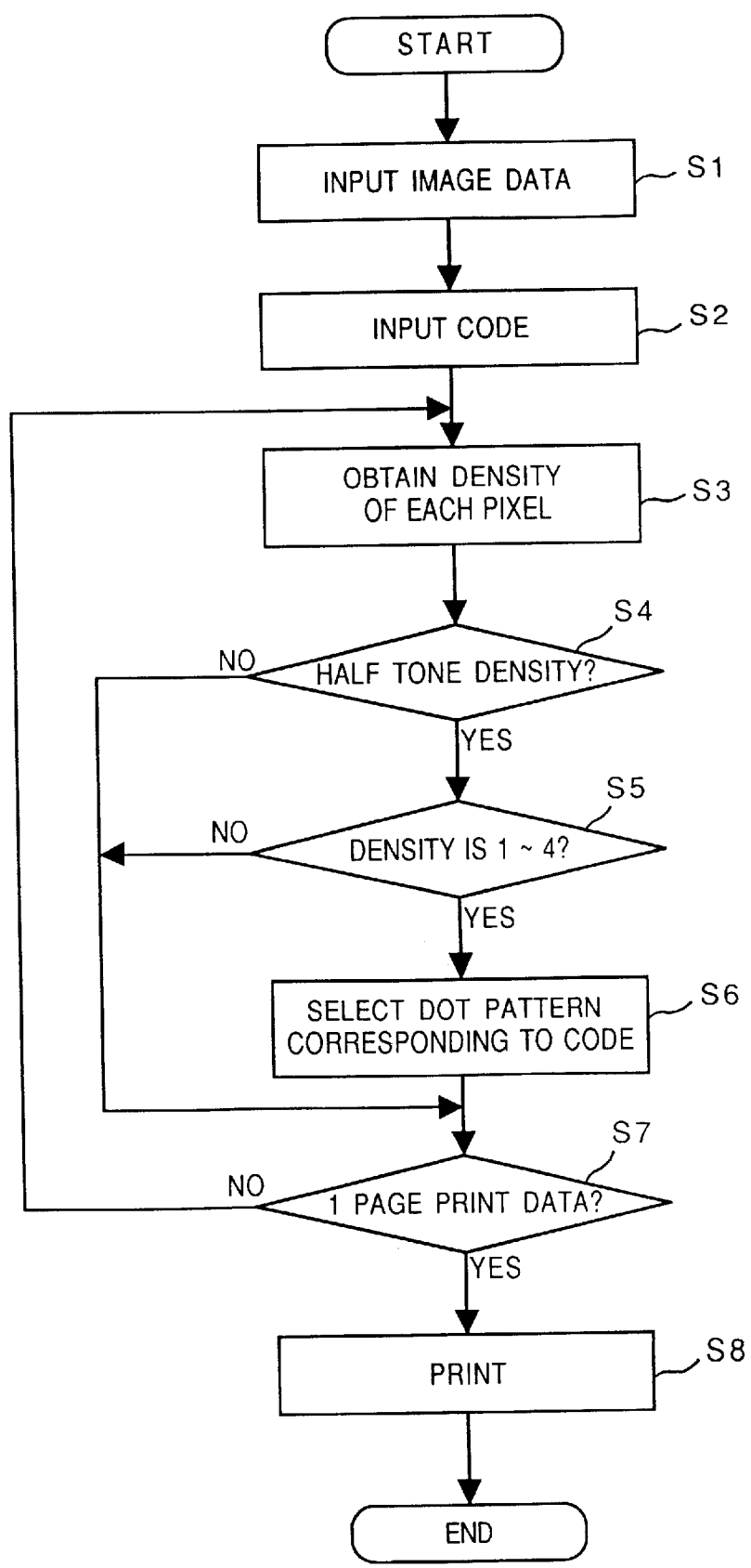
FIG. 4 is a flowchart illustrating a coding operation of image data by the controller of the first embodiment.

FIG. 4 is a flowchart illustrating the operation of the code printing apparatus of the first embodiment. The control program which executes this processing is stored in the ROM 111.

At step S1, image data is inputted, in a form of multi-level data, from the image input unit 102, and at step S2, a code is inputted from the code input unit 103. The process proceeds to step S3 where the density of each pixel of the image data inputted at step S1 is obtained. At step S4, whether or not an area is halftone is determined. If so, whether or not that area should include a code is determined, i.e., the area has the density level 1–4 in FIG. 2. If so, the process proceeds to step S6 where the pixel of that area is converted to the density pattern corresponding to the inputted code. This conversion is executed by selecting the density pattern corresponding to the code from the density pattern memory 104 based on the pixel density of the area. When the image data for one page is formed in this way, the process proceeds to step S8 where the image data including coded patterns is outputted to the printer and printing is performed.

More particularly, if "100" is inputted from the code input unit 103 as code data, "100" is converted to a binary number. If the inputted code data is represented by 8 bits, it is "01100100" in binary form. This binary number is then divided into 2-bit units with reference to FIG. 3. That is, the code data of "01100100" is read as "pattern No. 2 (01)", "pattern No. 3 (10)", "pattern No. 2 (01)" and "pattern No. 1 (00)".

As described above, according to this embodiment, when a halftone is expressed and printed by a pixel including a plurality of dots, a code can be inlayed in image data when the dot pattern (density pattern) and the code are made to correspond in accordance with the density of a pixel of the image data.

[Second Embodiment]

Figure 5:
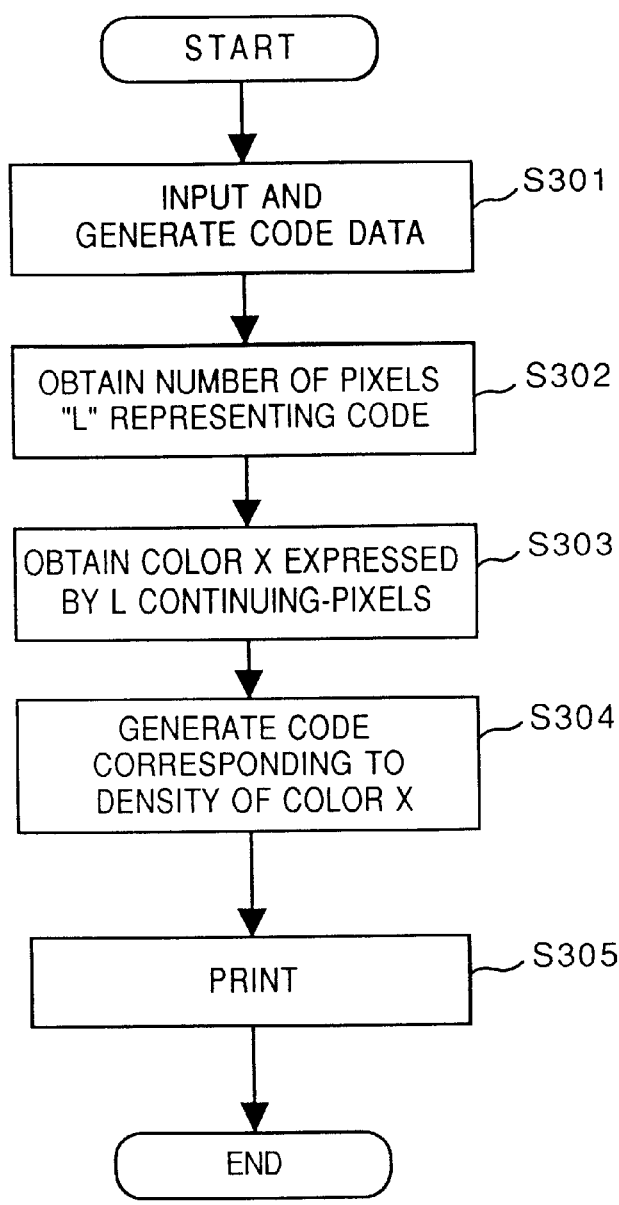
FIG. 5 is a flowchart illustrating an example where a part of the color image of the second embodiment is coded.

FIG. 5 is a flowchart illustrating the operation of the code printing apparatus of the second embodiment of the present invention. The flowchart of FIG. 5 describes a method for developing a code on an image by using a plurality of colors. The construction of the code printing apparatus of the second embodiment differs from that of the first embodiment in that image data from the image input unit 102 is a color image. The description of the similar parts is not needed. Note that the control program which executes this processing is also stored in the ROM 111.

Figure 6:
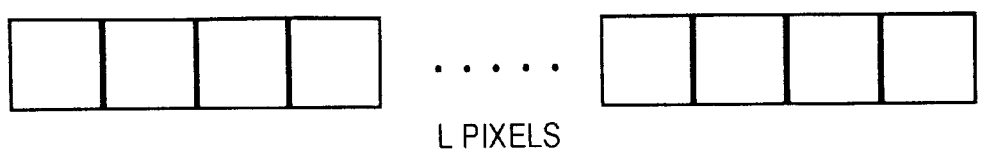
FIG. 6 is a diagram illustrating continuing-pixels of color X.

At step S301, data is inputted from the code input unit 103 and the inputted data is coded, e.g., the data is converted to binary data. The process proceeds to step S302 where the number of pixels "L" of an image required to express the code is calculated. For example, when the input data is coded to a binary number, since a pixel is expressed by two bits, as shown in FIGS. 2B–2D and FIG. 3, the number of required pixels can be obtained by dividing the number of bits of the binary number by "2". The process then proceeds to step S303 where a color X of the pixels which most often appear as at least L continuing-pixels, as shown in FIG. 6, is obtained. When the color to be used to print the code is determined, the process proceeds to step S304 where the density pattern representing the code is read out with reference to the density of each pixel of the color X, and is allotted to the pixel to correspond to the density.

As described above, when color image data is printed, a code is developed in the color image and printed on a recording medium without deterioration of the quality of an original image.

[Third Embodiment]

FIG. 7 is a diagram for explaining the third embodiment of the present invention.

In FIG. 7, the area A of the image printed on the recording medium 501, such as a card, is enlarged and shown in a circle. As shown in the circle, codes with a start bit 504 and a stop bit 505 are repeatedly printed on a background 502 of the image 503, on the recording medium 501. In the example of FIG. 7, the code is represented by 16 bits, and a dot is printed where the bit is "1". In this case, black ink is used to print the image 503, while yellow ink is used to print the codes. Thus, the image 503 and the code are printed in different colors. In this way, the image quality will not be deteriorated, while the codes are printed with the image on the recording medium 501. The construction of the hardware of the printing apparatus in the third embodiment is similar to that of the first embodiment, and it can be arranged such that a pattern corresponding to an input code can be read out of the memory 104 and printed on a background of an image.

Figure 8:
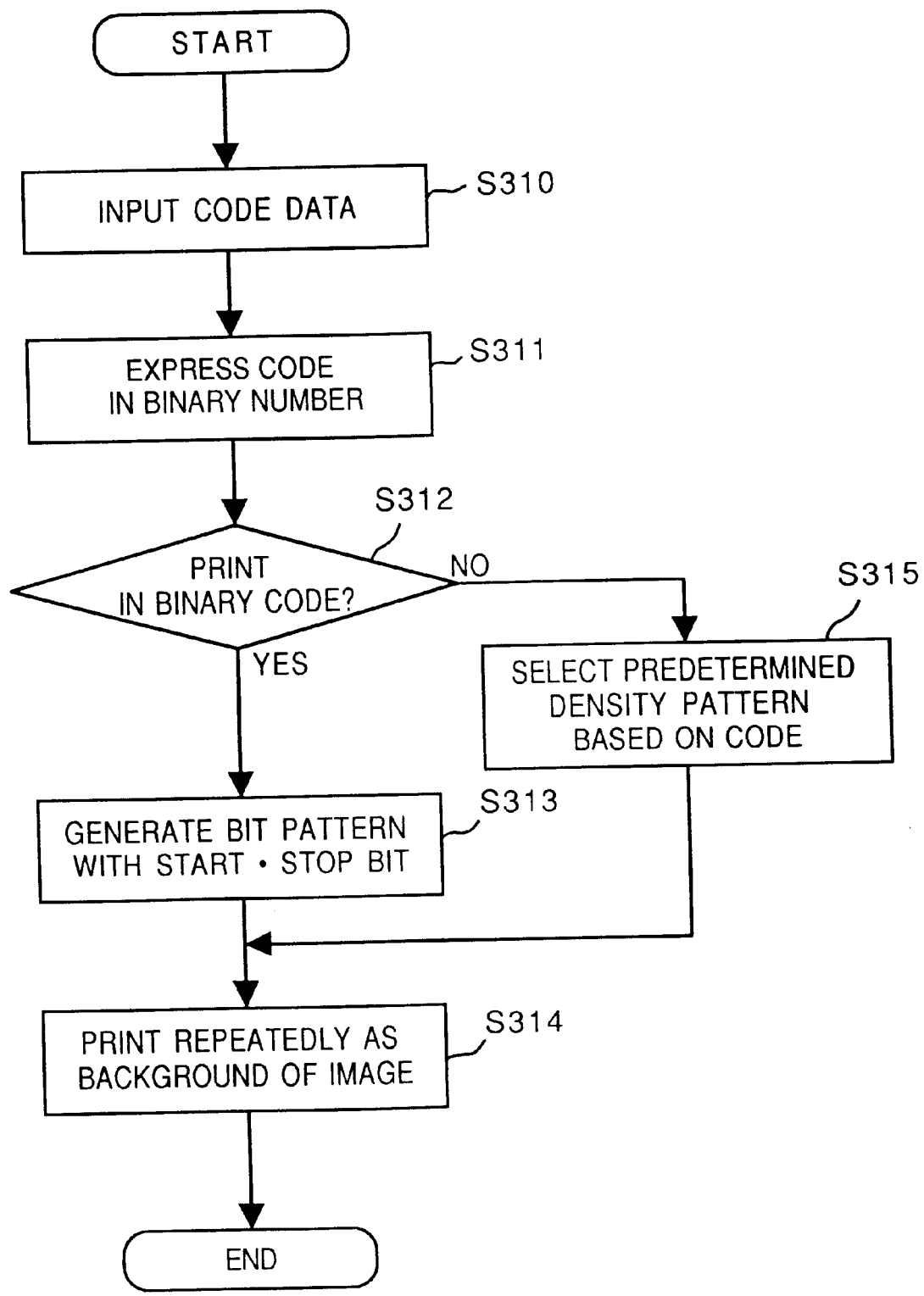
FIG. 8 is a flowchart illustrating the operation of the third embodiment.

This processing is illustrated by the flowchart of FIG. 8. The control program which executes this processing is stored in the ROM 111.

At step S310, code data is input from the code input unit 103 and expressed as a binary number (S311). The process proceeds to step S312 where it is determined whether the code data is expressed by a binary code (FIG. 7) or the pattern shown in FIGS. 2 and 3. This can be instructed by an operation panel which is not shown or the code data inputted from the code input unit 103. As shown in FIG. 8, when the code data is printed in a binary code, the process proceeds to step S313 where a bit pattern is formed with the start bit 504 at the beginning of the binary number obtained at step S311 and the stop bit at the end of the binary number so that the area of dots where the bit data is "1" is printed. Subsequently, the process proceeds to step S314 where the image pattern based on the bit pattern is repeatedly printed as a background of the image. Thus, the image 503 and background 502 are printed as shown in FIG. 7.

On the other hand, if printing is not in a binary code at step S312, the process proceeds to step S315 where the code represented by the binary number is divided in unit of 2 bits, and a density pattern corresponding to each 2-bits is selected with reference to FIG. 3. In this case, the density of the density pattern to be selected can be either one of the density patterns 1–3 of FIGS. 2B–2D. In this way, the background pattern is formed based on the selected density pattern, and the density pattern is printed on a background of an image at step S314.

In the above-described embodiment, an example is described where an image and a code are printed in different colors. However, when the color of the code is the same as that of the image, if colors whose densities are different from each other are used, the code can be printed without deterioration of the quality of the image.

[Fourth Embodiment]

Figure 9:
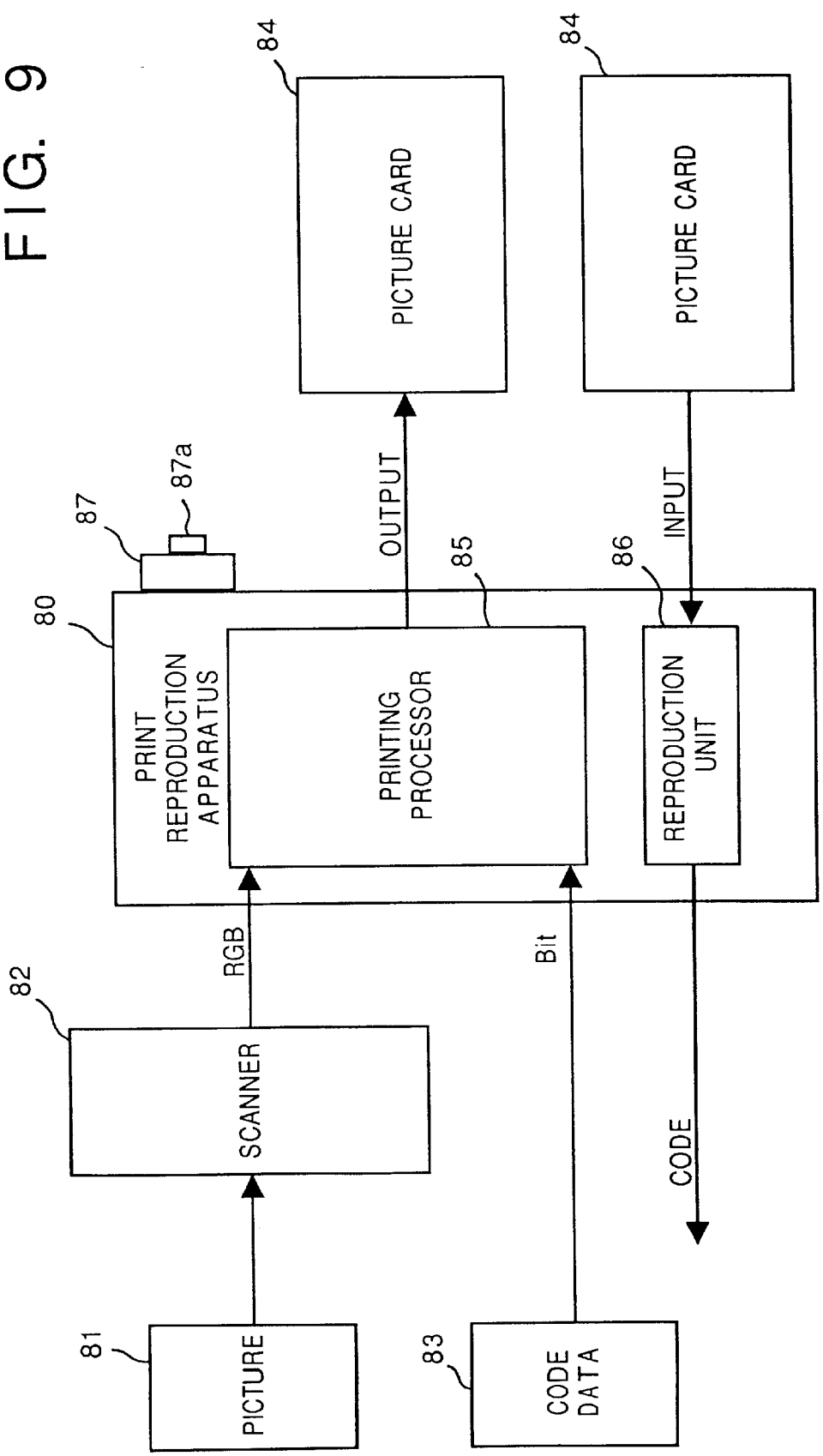
FIG. 9 is a block diagram illustrating a general construction of the code printing apparatus of the fourth embodiment of the present invention.

FIG. 9 is a block diagram illustrating an example of the print reproduction apparatus of the fourth embodiment of the present invention. This apparatus prints an image and a code together on a picture card, and reads the data printed on the card.

In FIG. 9, a picture 81 is read by an image input unit (numeral 102 of FIG. 1) such as a scanner 82, the image data of the picture 81 is subjected to color separation and converted to RGB multi-level data, and input to a print reproduction apparatus 80. On the other hand, code (data) 83 is input from a code input unit (numeral 103 of FIG. 1) in a form of bit data. The image data and code (data) 83 which are supplied to the apparatus 80 are formed as image data for printing after the processing which will be described later. The image data is printed on a card by using an ink-jet head which discharges inks of Y (yellow), M (magenta), C (cyan) and K (black) in the print reproduction apparatus 80. Thus, a picture card 84 is produced.

When the picture card 84 is read to reproduce the information printed on the card 84, the picture card 84 is inserted into the apparatus 80, and a key 87a on an operation panel 87 which instructs the reproduction processing is pressed. Subsequently, the reproduction processing which will be described later is performed. In this way, the coded information on the picture card 24 is read, and then the code is recognized.

Figure 10:
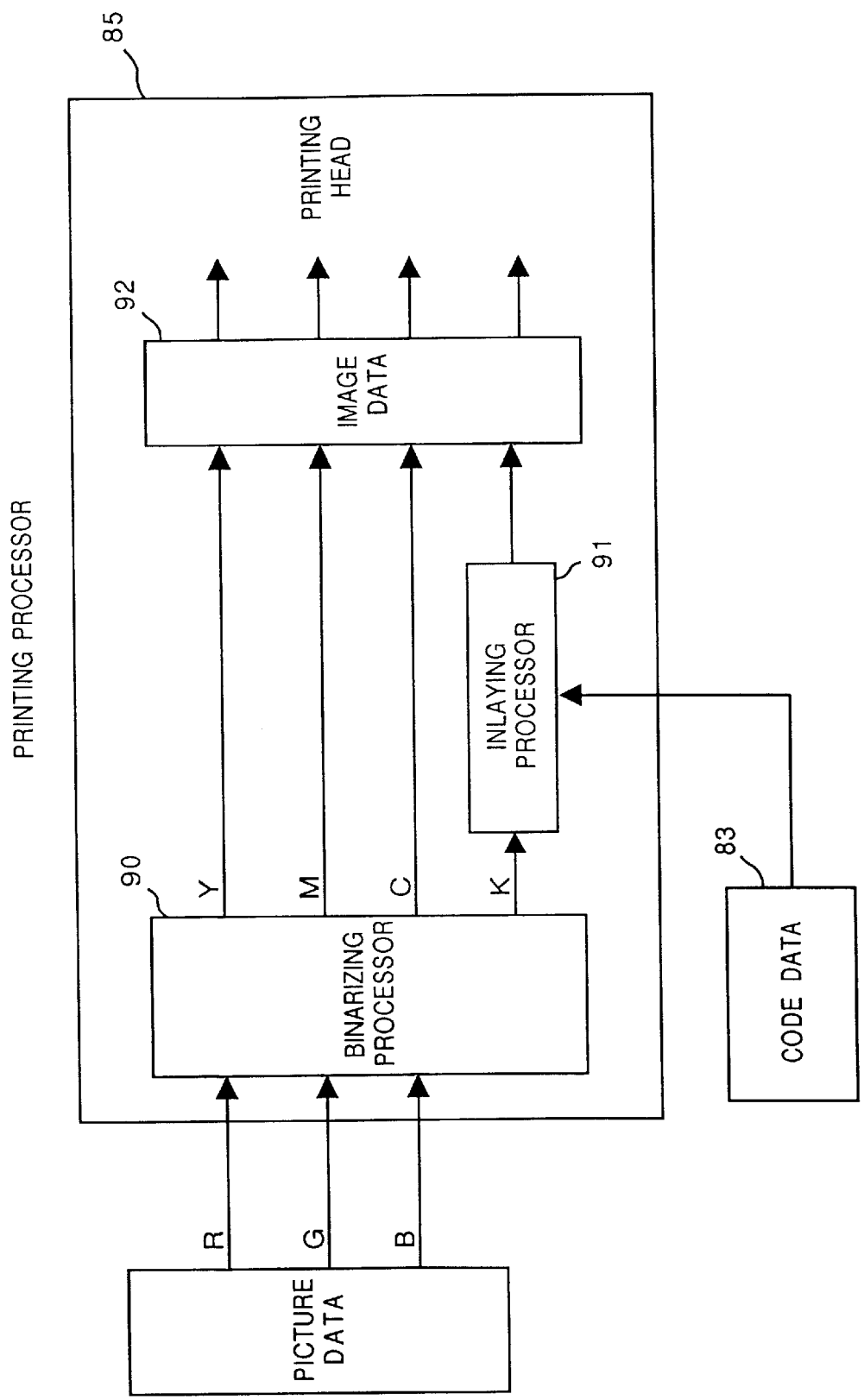
FIG. 10 is a block diagram illustrating the construction of a printing processor of the fourth embodiment.

FIG. 10 is a block diagram illustrating the construction of a printing processor 85 of the printing reproduction apparatus 80.

The picture data comprised of RGB multi-valued data is subject to logarithmic conversion, UCR and masking processing, and converted to multi-valued data of C, M, Y and K. The multi-valued data is binarized by an appropriate method in each color component. The data of C, M and Y among the data of C, M, Y and K are outputted to the printing head as printing image data 92, and printed on the picture card 84. K data is transferred to the printing head as the image data 92 after the inputted code data 83 is inlayed by the inlaying processor 91.

Figure 11A:
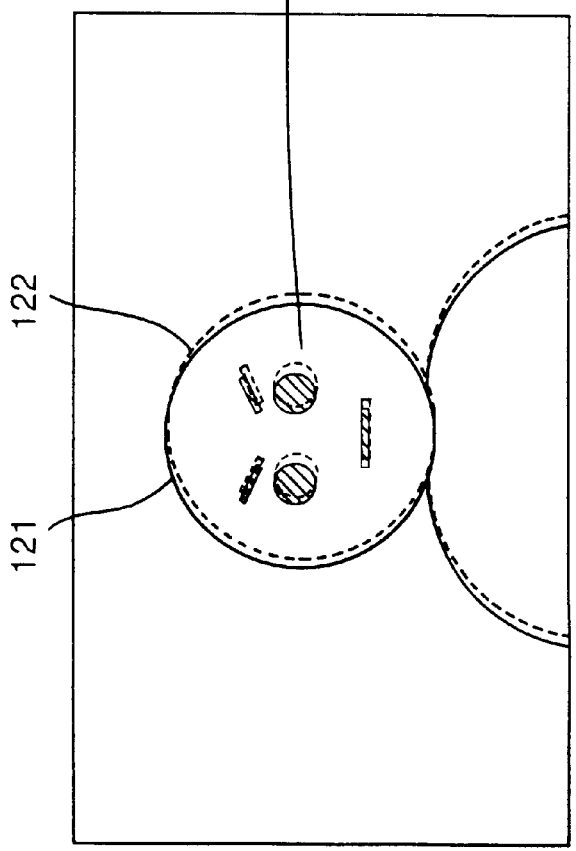
FIG. 11 is a diagram illustrating an example where an image and a code are printed together.
Figure 11B:
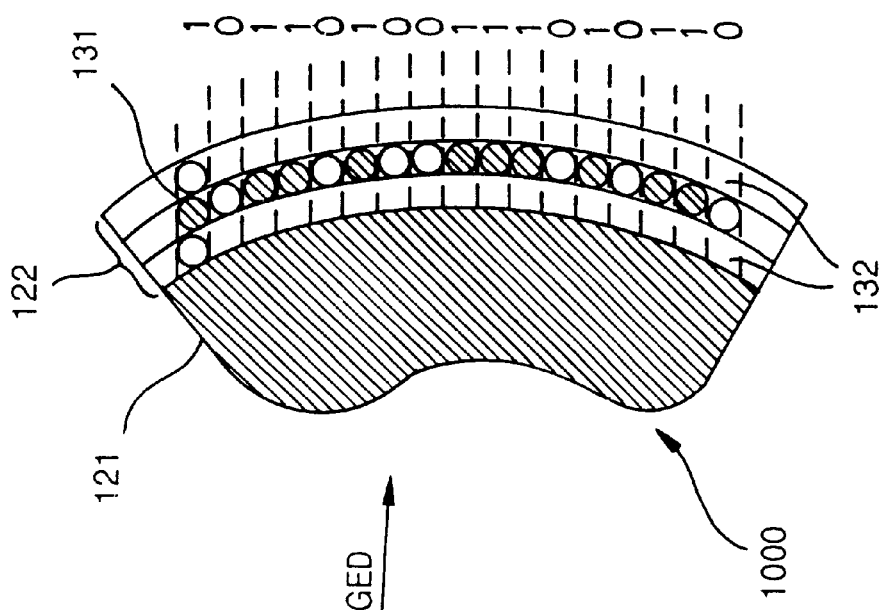

FIG. 11 is a diagram which is useful for explaining the principal for printing an image and a code together on a recording medium.

As shown in FIG. 11, the code 122 is printed near the right side of the edge of the image 121. The portion is enlarged and indicated by numeral 1000 of FIG. 11. In the embodiment, the code 122 is printed on the picture card 84 by the printing head with the image 121 which is read by the scanner 82. To improve the reliability of reading and writing the code 122, the space 132 of one dot is provided on both sides of the dots 131 of the code 122. Thus, the code 122 is printed in the area of three dots at the right side from the edge of the image 121.

As described above, a memory card including the image and code with good appearance and high confidentiality of the code can be provided.

[Fifth Embodiment]

In the fourth embodiment, the code 122 is printed on the right side of the edge of the image 121 (as shown in FIG. 11), however, a code can be printed on another portion depending on the shape of the image. For example, as shown in FIG. 12, the code can be printed at the top of the edge of the image 141 and the left side of the edge of the image 141.

In this case, an outline of the image 141 and a direction component of the outline are obtained, and the code 122 is printed on the outline whose length is longer than the other. Thus, the amount of information of the code 122 to be printed can be increased. Since the other parts of the construction in this embodiment and the operation are similar to those of the preceding embodiment, the description is not repeated.

[Sixth Embodiment]

Figure 13:
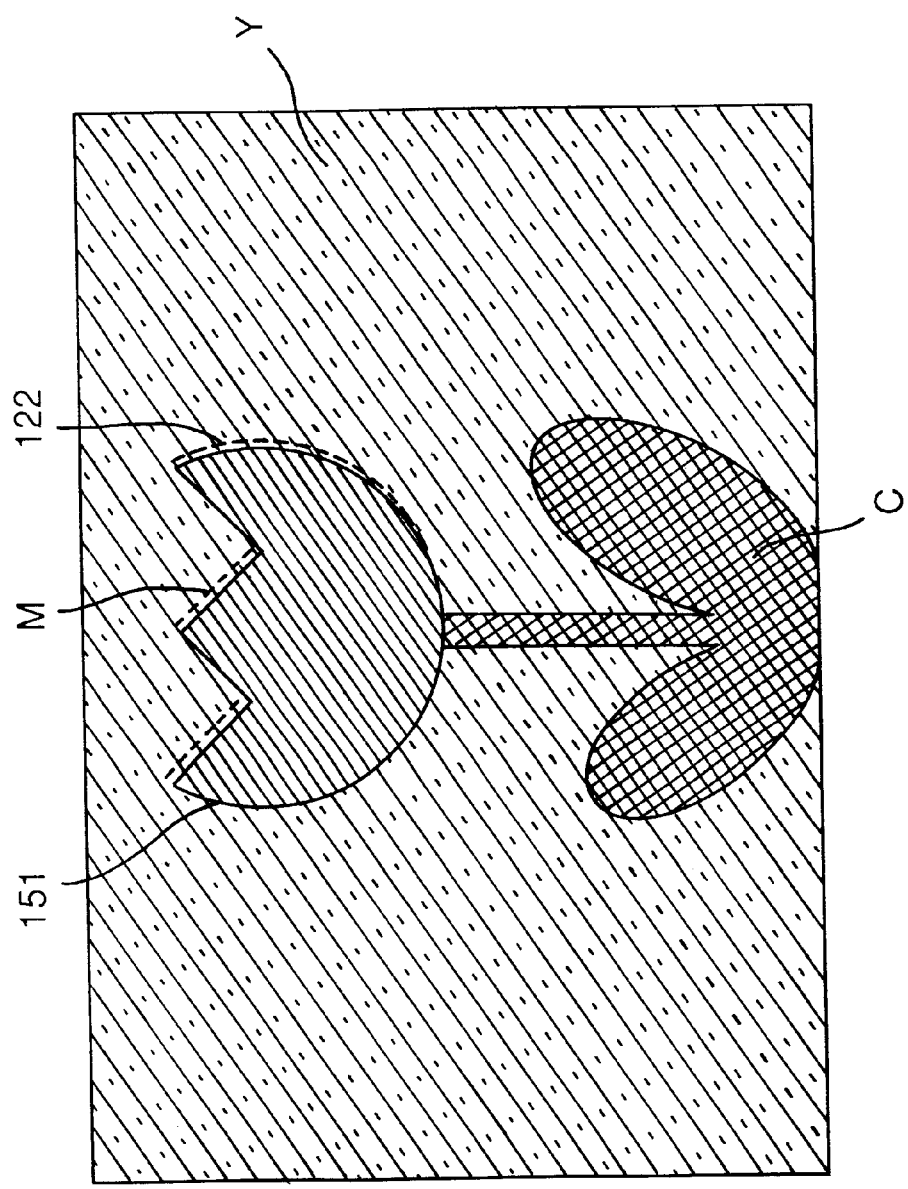
FIG. 13 is a diagram illustrating an example where an image and a code are printed in the fifth embodiment of the present invention.

In the third and fourth embodiments, the code 122 is printed in the vicinity of the edge of the image 121 or 141 regardless of its colors. However, as shown in FIG. 13, the code can be printed on the image 151 in a designated color (i.e. magenta in FIG. 13).

In this case, data capable of printing a code in the vicinity of the edge is obtained for each color of the image 151, and the color most capable of printing the codes is selected. The code 122 is then printed in that color in the vicinity of the edge of the image.

Accordingly, the code 122 can be printed efficiently in a color image having no empty space in the image 151. Since the other portions of the construction and the operation in this embodiment are similar to those of the preceding embodiments, the description is not repeated.

[Seventh Embodiment]

Figure 14:
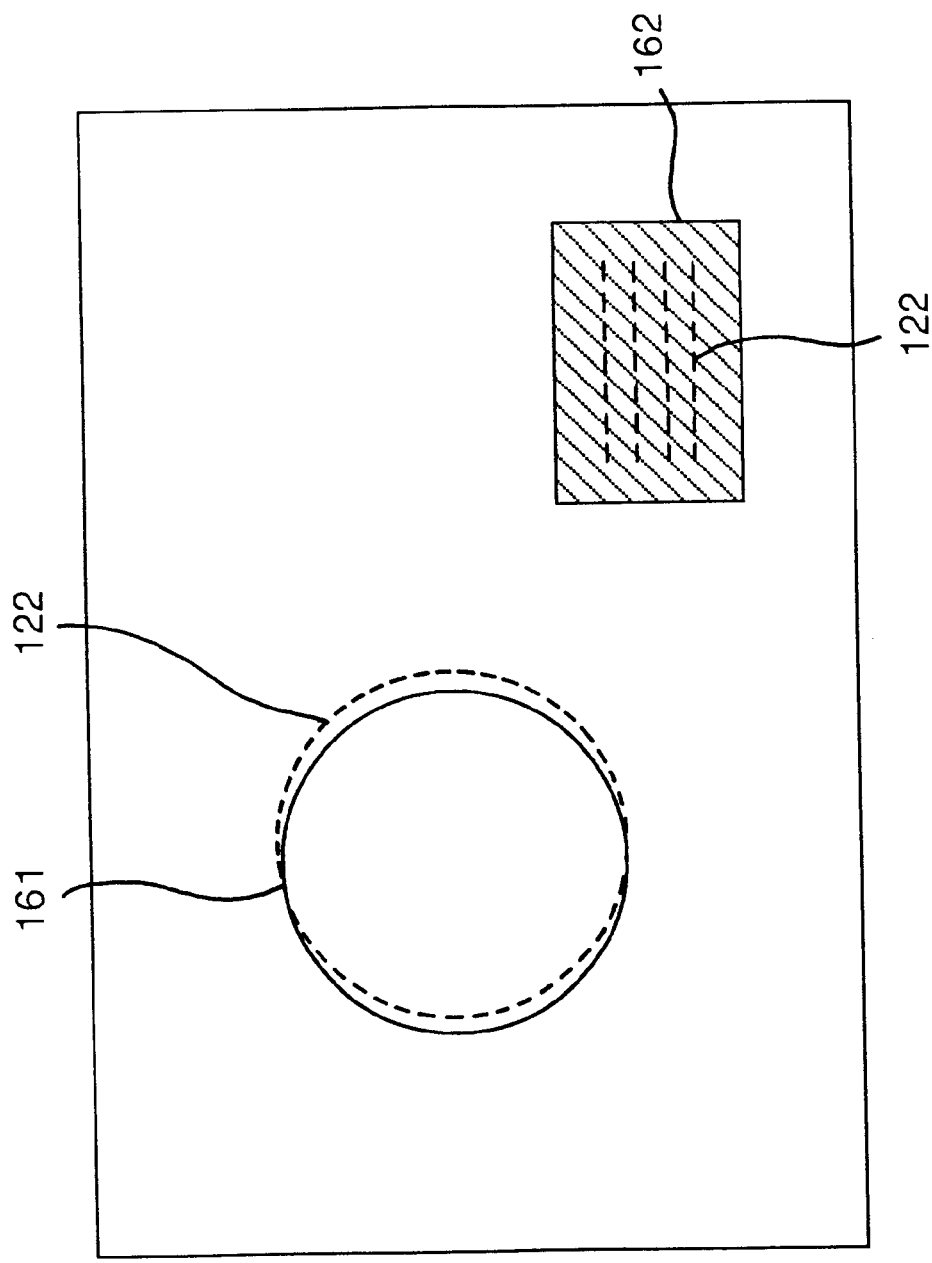
FIG. 14 is a diagram illustrating an example where an image and a code are printed in the sixth embodiment of the present invention.

In the sixth embodiment, the code 122 is printed in the vicinity of the edge of the image. However, as shown in FIG. 14, the code 122 can be printed within a predetermined area 162. In this case, the amount of the code data 122 to be printed in the vicinity of the edge of the image 161 is first obtained. If the amount of the code data 122 is less than provided, as shown in FIG. 14, dots representing the code 122 are printed in the predetermined area 162. The printed code can be a code pattern represented by a binary number or a density pattern as described in the preceding embodiments.

Accordingly, if information whose amount of data is less than the area provided in the vicinity of the image, all the information can be printed in the predetermined area 162. Since the other portions of the construction and the operation in this embodiment are similar to those of the preceding embodiments, the description is not repeated.

[Eighth Embodiment]

Figure 15:
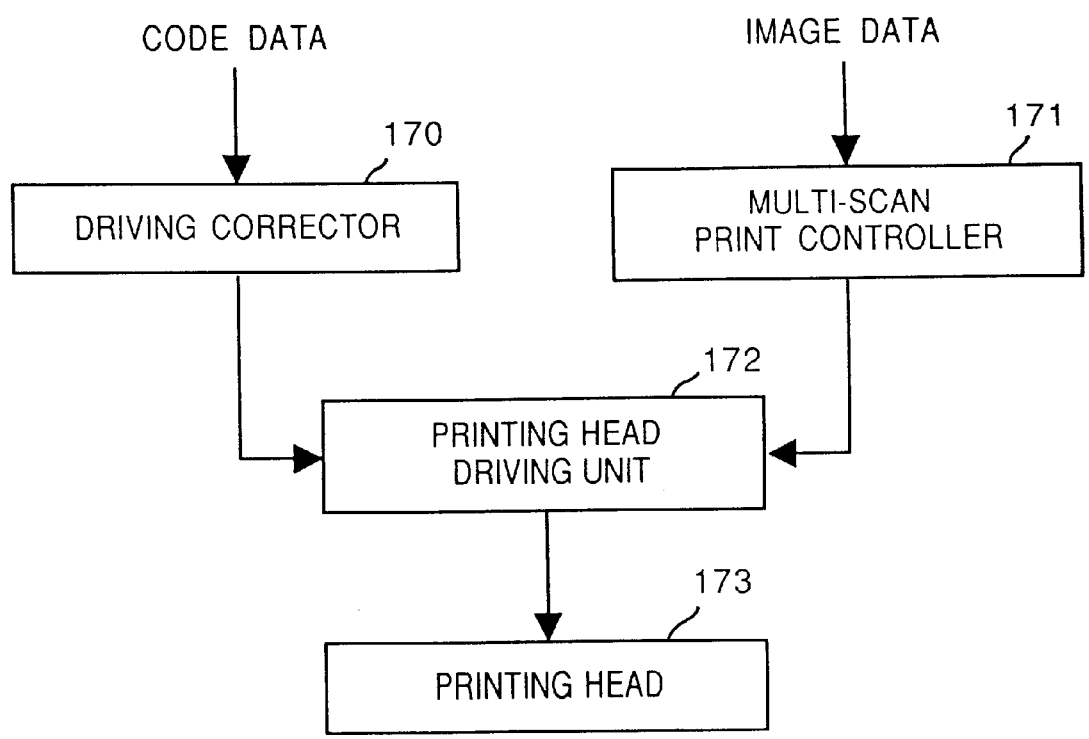
FIG. 15 is a block diagram illustrating a general construction of a code printing apparatus of the seventh embodiment of the present invention.
Figure 16:
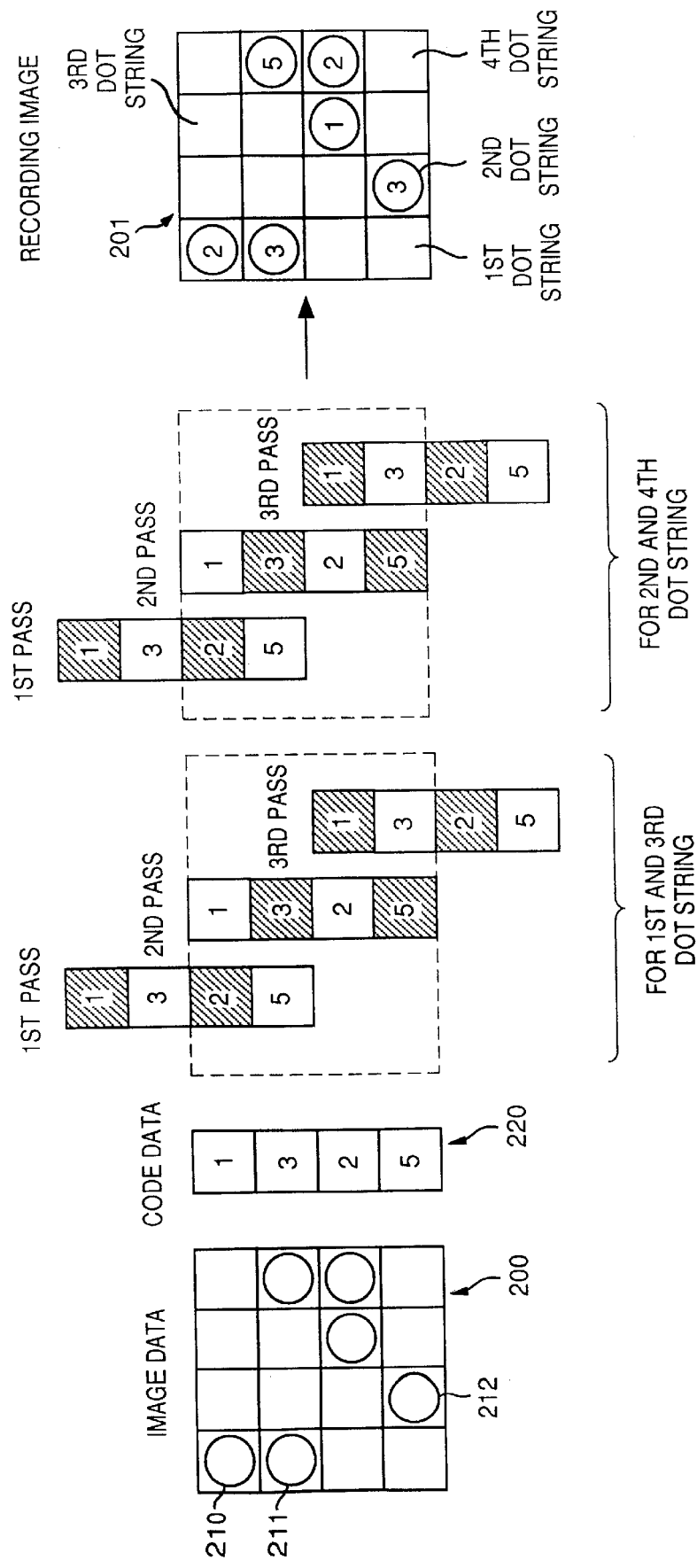
FIG. 16 is a diagram illustrating an example where image data is modulated by a code in the seventh embodiment.
Figure 17:
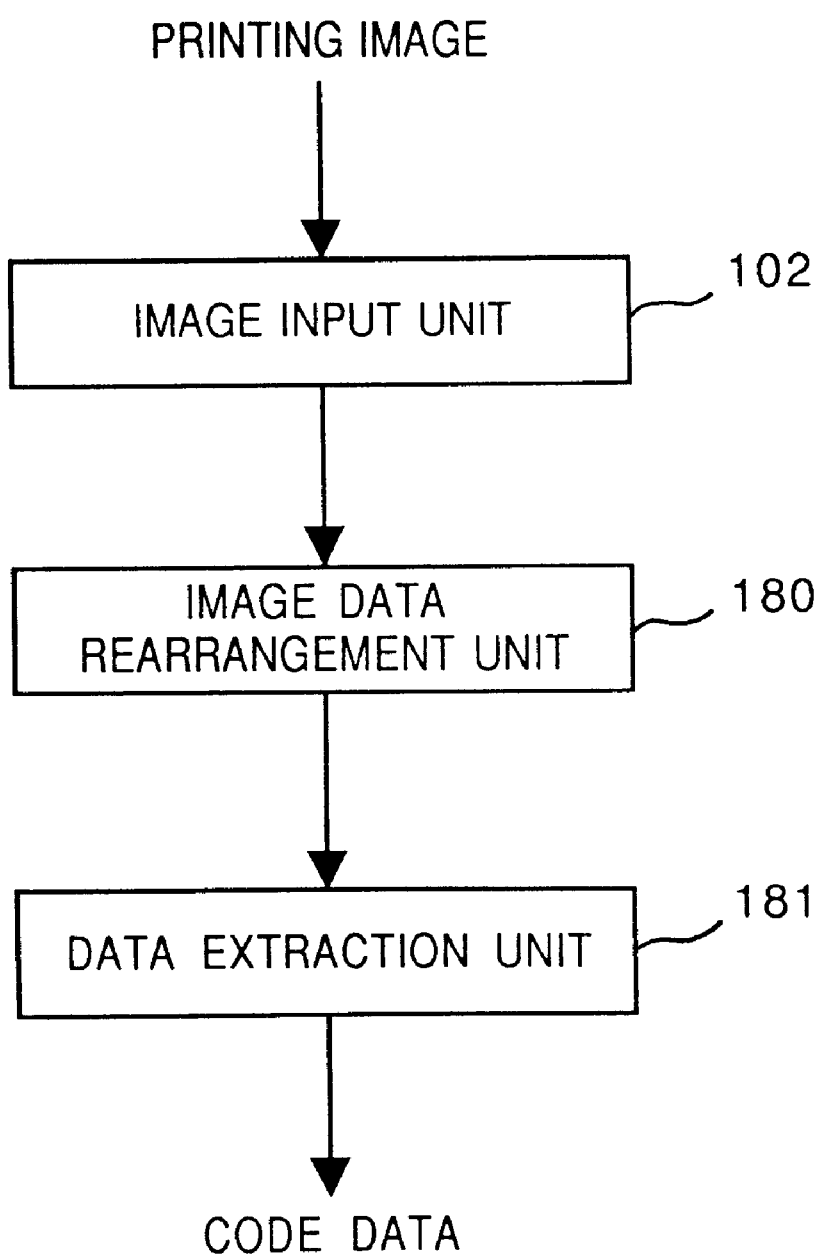
FIG. 17 is a block diagram illustrating a functional construction when the recording image in the seventh embodiment is read and the code is reproduced.

FIG. 15 is a block diagram illustrating the flow of the code data and image data in the eighth embodiment of the present invention. FIG. 16 is a diagram illustrating a principle of the method of inlaying a code into an image in the eighth embodiment. FIG. 17 is a block diagram illustrating the flow of the data in the case of data reproduction, and FIG. 18 is a diagram illustrating a principle of a reproduction method of code data. With reference with those figures, the detail is described below.

In FIG. 15, numeral 170 is a driving corrector which corrects driving conditions in each nozzle of a printing head 173 (the image data is modulated in accordance with the code), and changes the discharge amount of ink from each nozzle in accordance with the arrangement of the nozzles. The printing head 173 prints by scanning in the main scanning direction which is substantially perpendicular to the nozzle arrangement. On the other hand, numeral 171 is a multi scan print controller which prints an image by dividing the inputted image data in accordance with the group of nozzles of the printing head 173, and scanning the printing head 173 plural times and driving each group of nozzles in turn based on the divided image data.

FIG. 16 show an example where an image is printed when a multi-scanning pass printing by using each of the upper half and lower half nozzles of the printing head 173, moving the recording medium for a half length of the nozzle string in each scanning, and thinning by two patterns.

In FIG. 16, the nozzles whose discharge amount is modulated in accordance with the code data (1, 3, 2, 5) 220 is used and the image whose width is the same as that of the nozzle string is printed by three scanning operations. The image 201 is formed based on the original image data 200 by using the ink droplet whose discharge amount has been modulated by the code data 220.

More particularly, in the original image data 200, the pixel 210 in the first dot string is modulated by code "2" in the first pass, and the pixel 211 in the first dot string is modulated by code "3" in the second pass. The pixel 212 in the second dot string is modulated by code "3" in the third pass. Similarly, the pixel in the third dot string is modulated by code "1" in the third pass, and the pixels in the fourth dot string are respectively modulated by codes "5" and "2" in the first and second pass.

With reference to FIG. 17, the operation to reproduce the code data printed in the above-described way is described below.

In FIG. 17, a printed image is read by the image input unit 102, converted to a two-dimensional position information of the printing dot and the dot area (or density), and supplied to an image data rearranging unit 180. The unit 180 collects data in odd-number dot stings and even-number dot strings, respectively, and rearranges the data in accordance with the multi scan printing method at the printing operation. The data extraction unit 181 respectively carries out a logical OR in the rearranged odd-number-string data and a logical OR in the rearranged even-number-string data, and the original image data is reproduced (refer to FIG. 18).

More particularly, the pixel data in each string of the image 300 (which is obtained by reading the printed image 201) is read out, and the logical OR of the odd-number strings and the logical OR of the even-number strings are respectively obtained.

More particularly, in FIG. 18, the pixel data in each string of the image 300 obtained by reading the printed image 201 is read out, and the logical OR of the odd-number strings and that of the even-number strings are obtained. The results are indicated by numerals 301 and 302. In accordance with the data arrangement at the time of printing, a code as indicated by numeral 303 is obtained by exchanging the first and third pixels in the even-number string, and the second and fourth pixels in the odd-number string. This coincides with the code data 220 of FIG. 16.

Figure 19:
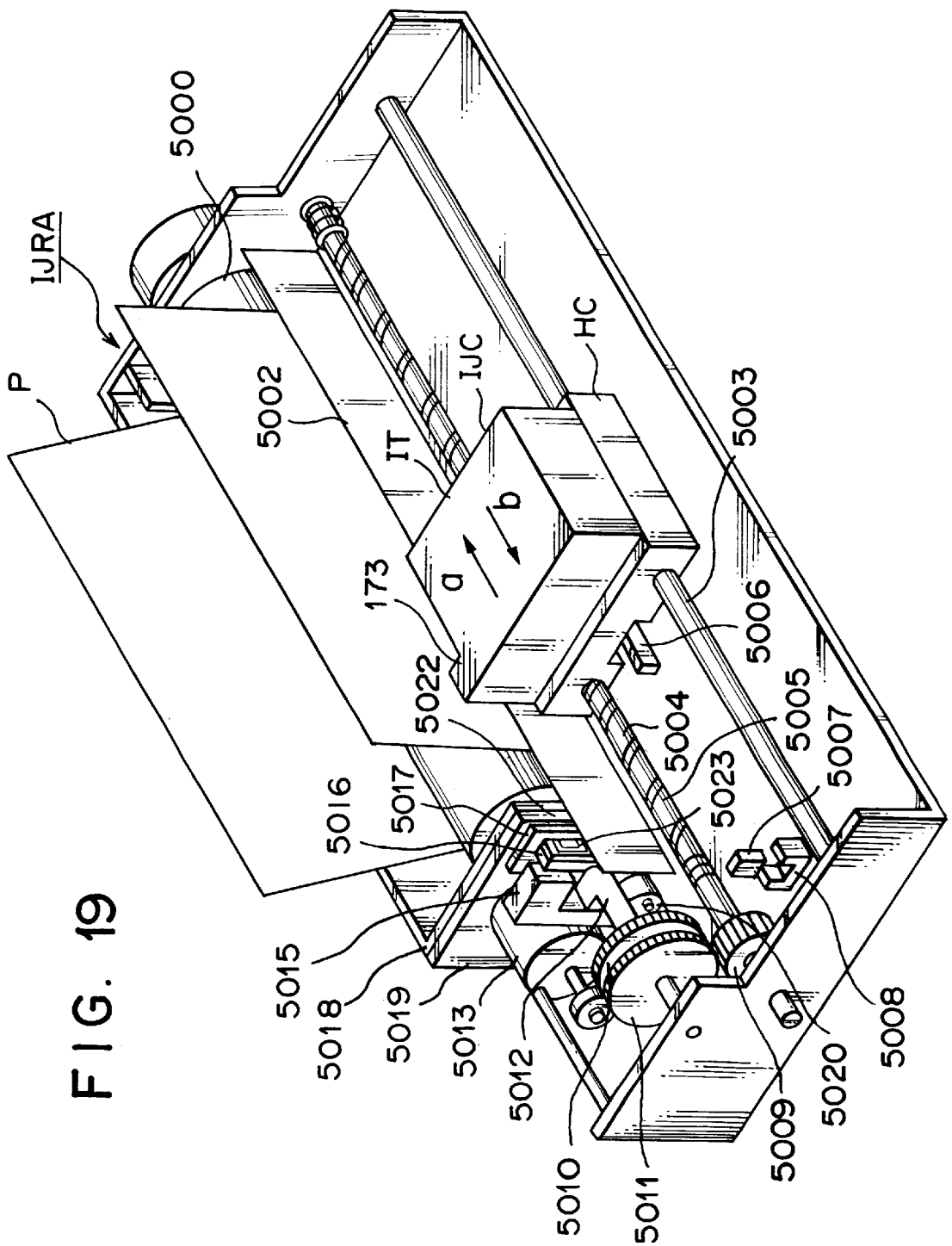
FIG. 19 is a diagram illustrating a general construction of an ink-jet printing apparatus to which the present invention is applied.

FIG. 19 is a diagram illustrating an exterior view of the ink-jet printing apparatus IJRA to which the present invention may be applied. In FIG. 19, a carriage HC is engaged with a spiral groove 5004 of the lead screw 5005 which rotates via the driving-force transmission gears 5011 and 5009 interlocking with forward/reverse rotation of the driving motor 5013. The carriage HC has a pin (not shown) to fit in the ditch of the lead screw 5005 and it reciprocates in the directions a and b. The carriage HC has an ink-jet cartridge IJC which is incorporated into the printing head 173. Numeral 5002 is a paper presser which presses a recording paper against the platen 5000 along the moving direction of the carriage HC. Numerals 5007 and 5008 are photocouplers which are home position detectors for confirming the existence of a carriage lever 5006 in this area and changing over the rotational direction of the motor 5013. Numeral 5016 is a supporting member which supports the cap member 5022 which caps the front surface of the printing head 173. Numeral 5015 is a suction unit which performs suction-restoration of the printing head inside of the cap member 5022 via cap inner opening 5023. Member 5019 allows cleaning blade 5017 to move in a back-and-forth direction. Main post support plate 5018 supports the member 5019 and the cleaning blade 5017. Instead of the above-described blade, a well-known cleaning blade is applicable to the printer of the present invention. Numeral 5012 is a lever for starting sucking operation along the movement of the cam 5020 engaged with the carriage HC. The lever 5012 can control the driving force from the driving motor by any well-known transmission means such as a clutch mechanism.

When the carriage arrives at the home position, processing, including the capping, cleaning and suction recovery, are constituted such that the processing is performed at the corresponding position by the operation of the lead screw 5005. Any of these processing is applicable to the printer of the embodiments, if the desired processing is performed at a well-known timing.

<Description of the Controlling Structure>

Figure 20:
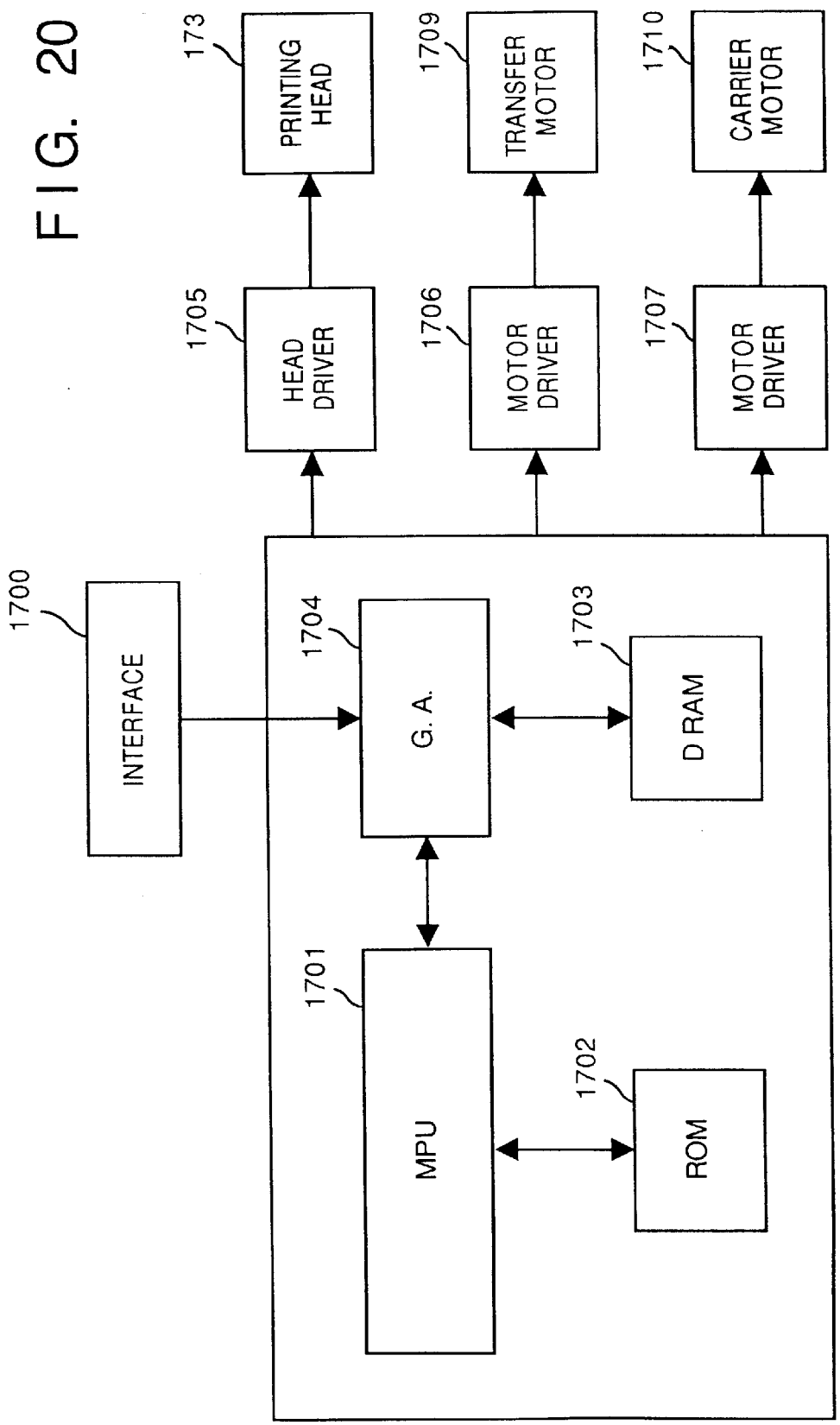
FIG. 20 is a block diagram illustrating the ink-jet printing apparatus of FIG. 19.

The controlling structure to execute the printing control of the above-described apparatus is described with reference to the block diagram shown in FIG. 20. In FIG. 20, numeral 1700 is an interface to input an image signal, numeral 1701 is a MPU, numeral 1702 is a program ROM which stores a control program which executes the MPU 1701. The ROM 1702 stores the processing program which modulates the image data based on code data. Numeral 1703 is a dynamic RAM which stores various data (i.e. the image signal or printing data which is supplied to the head). Numeral 1704 is a gate array which performs a supply control of the printing data to the printing head 173, and data transfer control among the interface 1700, MPU 1701 and RAM 1703. Numeral 1710 is a carrier motor which carries the printing head 173, and numeral 1709 is a transfer motor to transfer a recording paper. Numeral 1705 is a head driver which drives the head, numerals 1706 and 1707 are motor drivers which drive the transfer motor 1709 and the carrier motor 1701.

The operation of the above controlling construction is described below. When an image signal is inputted to the interface 1700, the recording signal is converted to printing data between the gate array 1704 and the MPU 1701. Subsequently, the printing head 173 is driven in accordance with the printing data transferred to the head driver 1705.

The image printed in this way is an image including high space frequency component since the correlation with the code data is small and random. Accordingly, since the code is visually indistinguishable, a code having high confidentiality can be printed, and the image data and code can be printed together without deterioration of the image quality.

Figure 21:
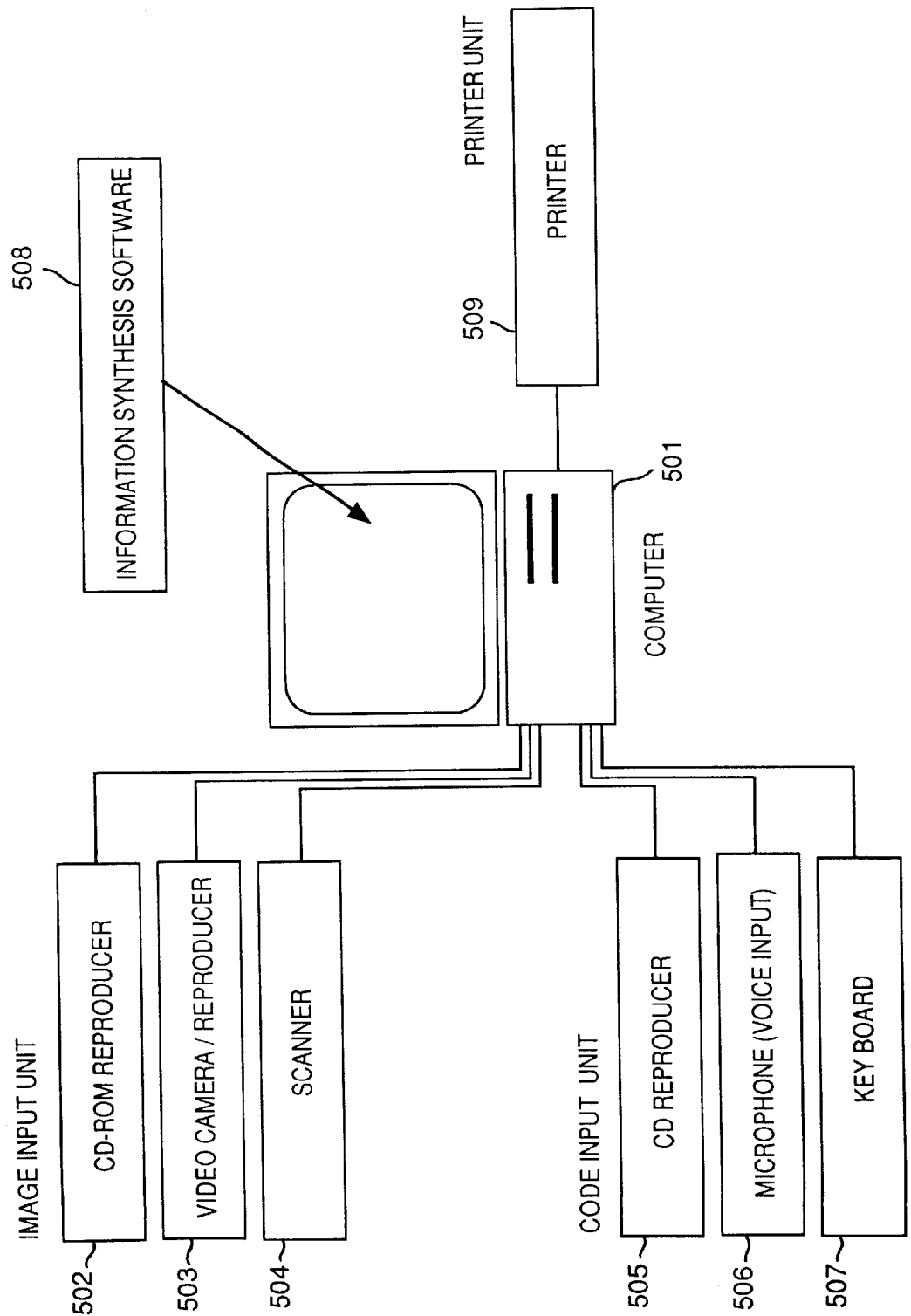
FIG. 21 is a block diagram illustrating an example of the code printing apparatus of FIG. 1 of this embodiment.

FIG. 21 is a diagram illustrating an example of a system configuration of the code printing apparatus shown in FIG. 1.

For the image input unit 102 of FIG. 1, a CD-ROM reproducer (capable of using an existing image file) 502, a video camera/reproducer (capable of inputting an original image) 503 and a scanner (capable of inputting pictures or photographs) 504 are used. Furthermore, image data formed by using software for drawing (not shown) operated on by the computer 501 can be used in the similar way to the image inputted from the image input unit 102. For the code input unit 103, a sound or music reproducer such as microphone 506 or CD reproducer 505 can be used. When the microphone 506 or CD reproducer 505 is used, software or a circuit is needed to convert the sound or music to codes. Furthermore, the computer 501 can be used in place of the controller 101.

Furthermore, for the density pattern memory 104, hardware (not shown) can be provided in the computer 501 or it can be provided as an information synthesis software 508 operated by the computer 501. For the printer 105, any printer, such as printer 509, capable of connecting to the computer 501 is used. Furthermore, in FIG. 21, each unit of FIG. 1 is described in the combination of the units capable of connecting to the computer 501. However, it can be arranged so that other units having required functions are assembled.

[Ninth Embodiment]

Figure 22:
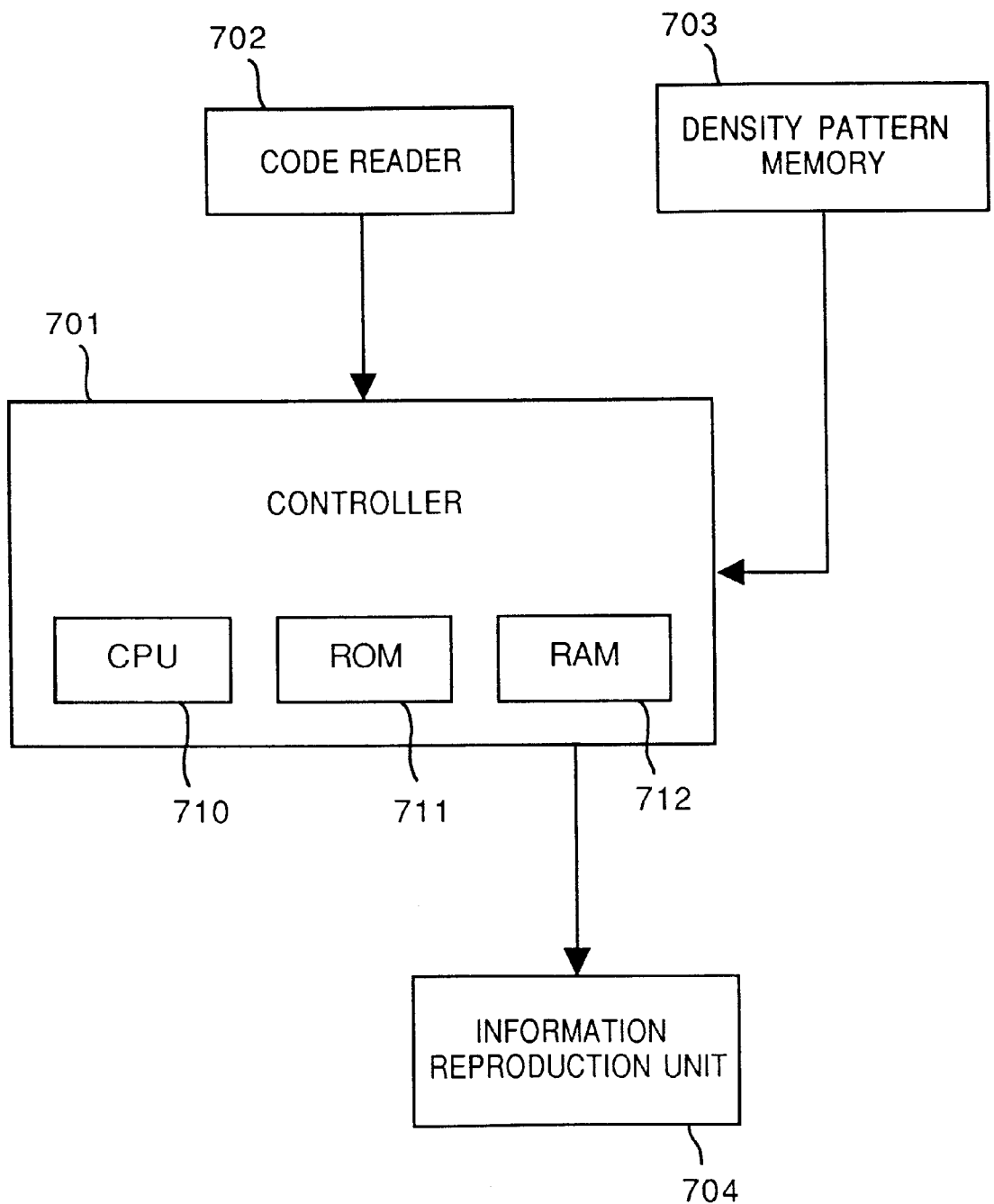
FIG. 22 is a block diagram illustrating a general construction of a card reading apparatus of the ninth embodiment of the present embodiment.
Figure 23:
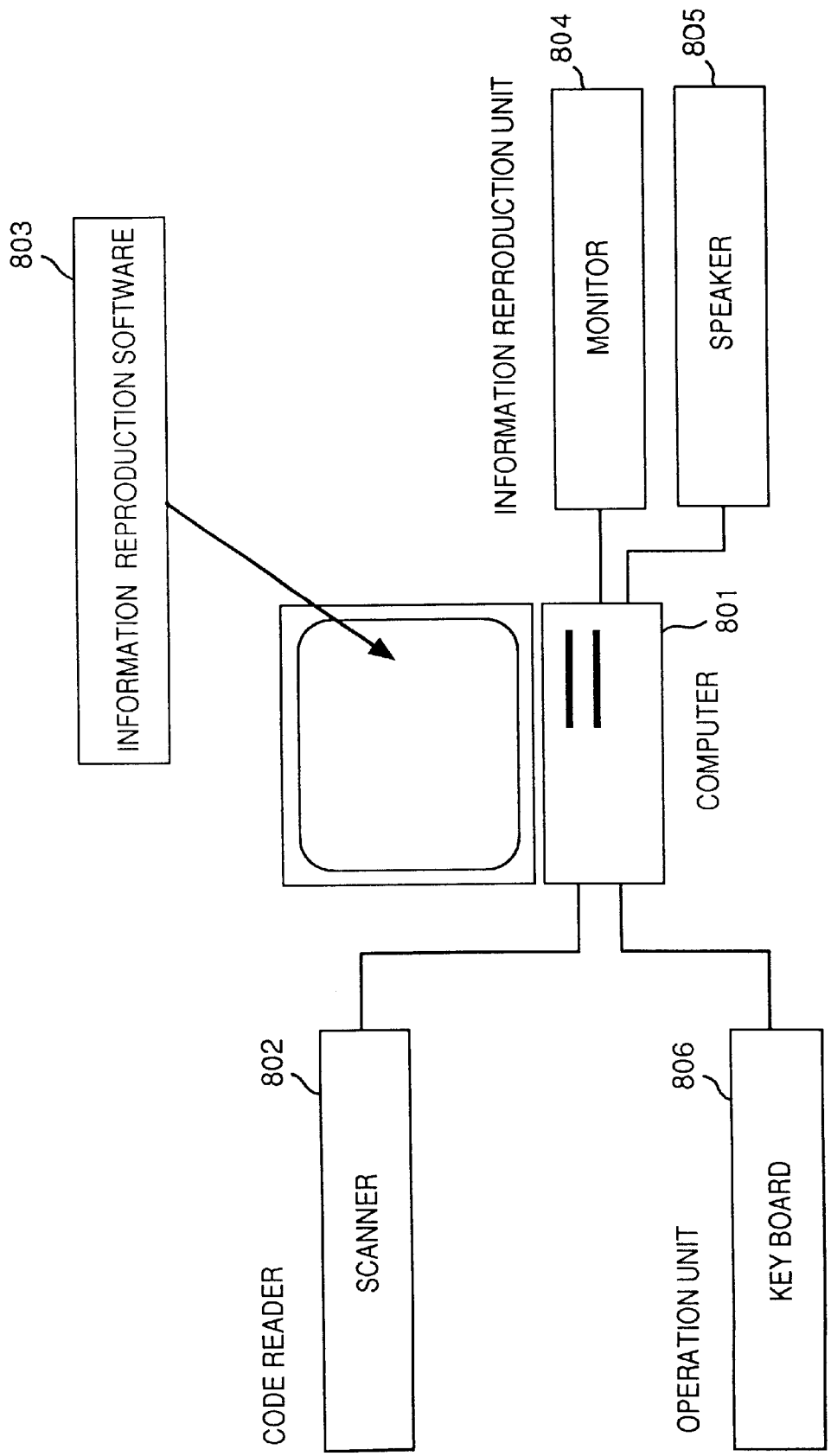
FIG. 23 is a block diagram illustrating an example of the construction of FIG. 22.
Figure 24:
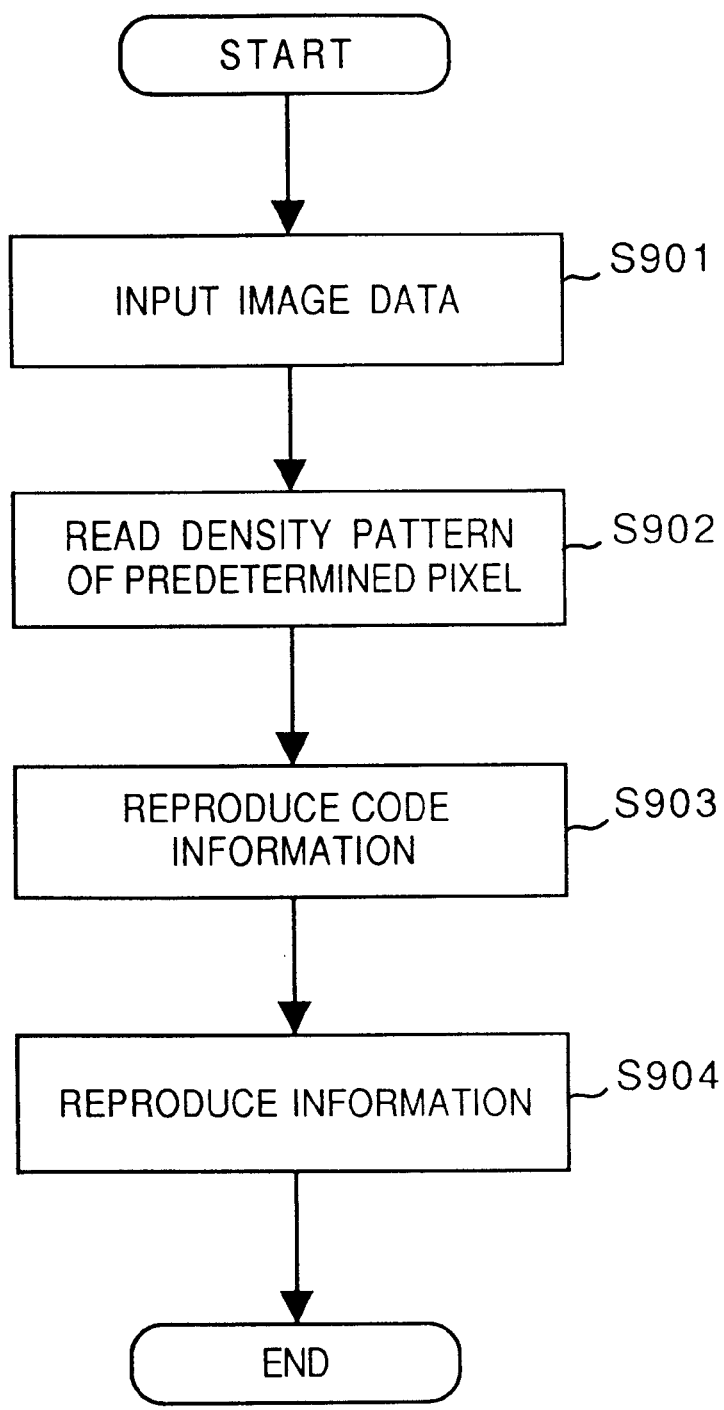
FIG. 24 is a flowchart illustrating the processing of the ninth embodiment.

With reference to FIGS. 22–24, a case of reading a code printed on a card is described below.

FIG. 22 is a block diagram illustrating the construction of a card reading apparatus of this embodiment.

In FIG. 22, numeral 701 is a controller which controls the entire apparatus, and numeral 702 is a code reading unit of the card reading apparatus which reads code information printed so as to be inlayed into an image by the printer 509 of FIG. 21. Numeral 703 is a density pattern memory which stores density patterns to express a pixel in multi-levels. For example, the density patterns corresponding to each density as shown in FIG. 2 are stored. Numeral 704 is an information reproduction unit which expresses the code information read by the code reading unit 702 in a form such that the code may be visually or audibly recognized. Furthermore, the controller 701 includes a CPU 710 such as a microprocessor, a ROM 711 which stores a control program of the CPU 710 and various data, and RAM 712 which is used as a work area of the CPU 710 and stores various data.

FIG. 23 is a diagram illustrating an example of a system configuration of the apparatus shown in FIG. 22.

The scanner 802 of FIG. 23 corresponds to the code reading unit 702 of FIG. 22. Hardware (not shown) similar to the above-described density pattern memory 104 may be provided in the computer 801, however, an information reproduction software 803 operated by the computer 801 may be used. The computer 801 corresponds to the controller 701. Furthermore, a monitor (capable of displaying characters) 804 and a speaker (capable of voice expression) 805 for the information reproduction unit 704. Numeral 806 is a key board which operates the computer 801. Furthermore, in FIG. 23, each unit of FIG. 22 is described as the combination of units having functions capable of connecting to the computer 801. However, it may be arranged so as to assemble each unit having the necessary function.

FIG. 24 is a flowchart illustrating the operation of the card information reading apparatus shown in FIG. 22. The control program which executes the processing is stored in the information reproduction software 803 or the ROM 711.

At step S901, the image including the code information in the image processing area is read by the code reading unit 702. Subsequently, at step S902, the density pattern of the image data in a predetermined area of the image data read at step S901 is read out. The process proceeds to step S903 where the read density pattern in the predetermined area is compared with the density pattern stored in the density pattern memory 703 to obtain the code information corresponding to the density pattern. The process proceeds to step S904 where the obtained code information is converted and reproduced in a form such that the information in the information reproduction unit 704 may be visually or audibly recognized.

Image information is comprised of a plurality of dots, the information or audio information concerning the image information is coded, and the code is inlayed to the plurality of dots comprising the image information, and printed on a recording medium such as paper or resin with the image information. When this recording medium is used as a medium for information transmission, there are the following advantages over the conventional magnetic recording card, bar code and CD-ROM.

(1) Since an image printed on a recording medium (such as a card) uniquely corresponds to a code, the code relating to the image can be easily determined by visually distinguishing the image.

(2) Since inexpensive materials such as paper or plastic can be used as a recording medium, and a unit for printing a recording medium or a unit for reading the recording medium can be also produced at low cost. Accordingly, a card can be produced for and used by an individual.

(3) Since code information can be printed in an image, for example, a picture and its caption can be printed as code information, artistic value of the picture will not be reduced and a good appearance can be provided.

(4) Since a photography/picture printed on a card can be visually distinguished and a code is not easily distinguished, a card can be used for an educational purpose so as to memorize, for example, the name of an artist on a picture.

(5) Since a code is printed in visual dots, erasing the code due to degaussing in a magnetic field can be avoided.

The above-described card as an information transmission means can be applied to the following:

(a) A card for foreign language studies where data of dialogue in an arbitrary language is printed on a photograph or picture;

(b) A letter or message card including a photograph as image data, and characters/voice are used as codes (the content will be confidential to a third person); and (c) Private cards (transcript or membership card) where image data including a photograph of a card owner is used, and the data concerning the owner is printed as code information.

In the ninth embodiment, the recording medium where a code relating the printed image information is described. However, data which is not directly related to the image information can be printed.

Figure 25:
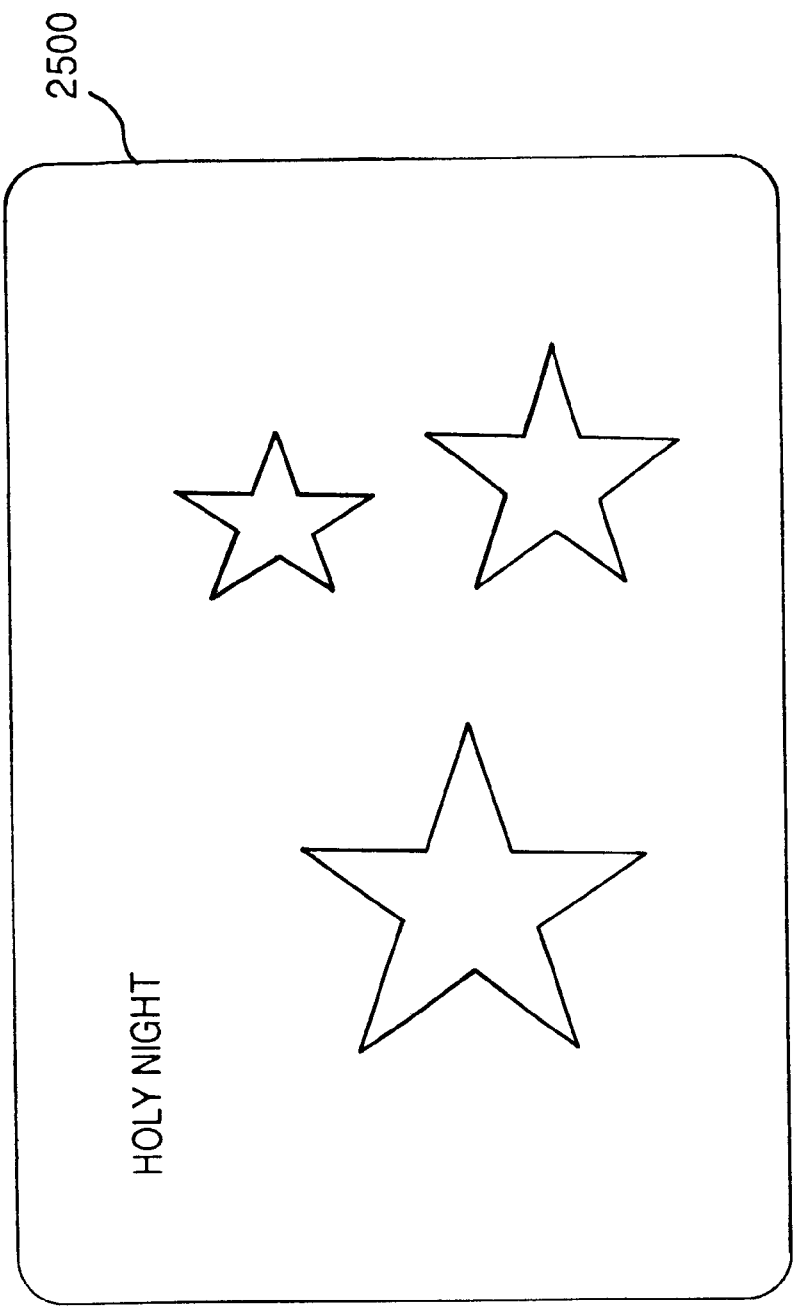
FIG. 25 is a diagram illustrating a modification of the ninth embodiment.

FIG. 25 is a diagram illustrating an example where the title "Holy Night" is printed as a code on a music card 2500 with scenery (a musical box card).

Accordingly, data which is not directly related to the printed image can be coded and printed with the distinguishable scenery. The card 2500 is produced as described in the ninth embodiment, the similar advantages can be obtained by reading the card 2500.

Furthermore, the functions and operations described in the respective embodiments can be performed independently or in combination.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A code printing apparatus for printing a color image including a code on a recording medium, comprising:

a dot pattern storage device, arranged for storing a plurality of dot patterns corresponding to a predetermined pixel density, each of the dot patterns corresponding to code data;

a calculator, arranged for calculating a number L of continuous pixels required to represent input code data;

a color obtaining device, arranged for obtaining the color of pixels in which the input code data is to be inlaid on the basis of the color which has the highest occurrences in at least L continuous pixels of an input color image;

a density determiner, arranged for determining the density of each pixel having an obtained color;

a controller, arranged for reading out a dot pattern corresponding to input code data from among the plurality of dot patterns having the density of the pixel determined by said density determiner, and for converting the colors of pixels of the color image into the dot patterns corresponding to the input code data; and a printer, arranged for printing the color image including the dot patterns obtained in the converting operation performed by said controller.

2. A code printing apparatus according to claim 1, wherein said controller converts only the colors of pixels which are halftone pixels.

3. A code printing apparatus according to claim 1, wherein at least some of the plurality of dot patterns stored in said dot pattern storage device correspond to the same density and each of the dot patterns is assigned to different code data.

4. A code printing apparatus according to claim 1, wherein said controller is adapted to not convert the colors of pixels having a minimum density or a maximum density.

5. A method for printing a color image including a code on a recording medium, comprising the steps of:

storing a plurality of dot patterns corresponding to a predetermined pixel density in a storage device, each of the dot patterns corresponding to code data;

calculating a number L of continuous pixels required to represent input code data;

obtaining the color of pixels in which the input code data is to be inlaid on the basis of the color which has the highest occurrences in at least L continuous pixels of an input color image;

determining the density of each pixel having an obtained color;

reading out a dot pattern corresponding to input code data from among the plurality of dot patterns having the density of the pixel determined in said determining step, and converting the colors of pixels of the color image into the dot patterns corresponding to the input code data; and printing the color image including the dot patterns obtained in said converting step.

6. A method according to claim 5, wherein said converting step converts only the colors of pixels which are halftone pixels.

7. A method according to claim 5, wherein at least some of the plurality of dot patterns stored in said dot pattern storage device correspond to the same density and each of the dot patterns is assigned to different code data.

8. A method according to claim 5, wherein said converting step does not convert the colors of pixels having a minimum density or a maximum density.

9. A computer-readable medium storing program code having instructions for executing a method for printing a color image including a code on a recording medium, the method comprising the steps of:

storing a plurality of dot patterns corresponding to a predetermined pixel density in a storage device, each of the dot patterns corresponding to code data;

calculating a number L of continuous pixels required to represent input code data;

obtaining the color of pixels in which the input code data is to be inlaid on the basis of the color which has the highest occurrences in at least L continuous pixels of an input color image;

determining the density of each pixel having an obtained color;

reading out a dot pattern corresponding to input code data from among the plurality of dot patterns having the density of the pixel determined in said determining step, and converting the colors of pixels of the color image into the dot patterns corresponding to the input code data; and printing the color image including the dot patterns obtained in said converting step.

10. A computer-readable medium according to claim 9, wherein said converting step converts only the colors of pixels which are halftone pixels.

11. A computer-readable medium according to claim 9, wherein at least some of the plurality of dot patterns stored in said dot pattern storage device correspond to the same density and each of the dot patterns is assigned to different code data.

12. A computer-readable medium according to claim 9, wherein said converting step does not convert the colors of pixels having a minimum density or a maximum density.

13. A program product which comprises program code for executing a method for printing a color image including a code on a recording medium, the method comprising the steps of:

storing a plurality of dot patterns corresponding to a predetermined pixel density in a storage device, each of the dot patterns corresponding to code data;

calculating a number L of continuous pixels required to represent input code data;

obtaining the color of pixels in which the input code data is to be inlaid on the basis of the color which has the highest occurrences in at least L continuous pixels of an input color image;

determining the density of each pixel having an obtained color;

reading out a dot pattern corresponding to input code data from among the plurality of dot patterns having the density of the pixel determined in said determining step, and converting the colors of pixels of the color image into the dot patterns corresponding to the input code data; and printing the color image including the dot patterns obtained in said converting step.

14. A program product according to claim 13, wherein said converting step converts only the colors of pixels which are halftone pixels.

15. A program product according to claim 13, wherein at least some of the plurality of dot patterns stored in said dot pattern storage device correspond to the same density and each of the dot patterns is assigned to different code data.

16. A program product according to claim 13, wherein said converting step does not convert the colors of pixels having a minimum density or a maximum density.

* * * * *